United States Patent [19]
Sennott et al.

[11] Patent Number: 5,343,209
[45] Date of Patent: Aug. 30, 1994

[54] NAVIGATION RECEIVER WITH COUPLED SIGNAL-TRACKING CHANNELS

[76] Inventors: James W. Sennott, 418 N. Linden St., Bloomington, Ill. 61701; David Senffner, 1104 N. Orange St., Peoria, Ill. 61606

[21] Appl. No.: 880,135

[22] Filed: May 7, 1992

[51] Int. Cl.$^5$ .......................... G01S 5/02; G01S 1/08; G01C 21/00
[52] U.S. Cl. ..................... 342/357; 342/386; 342/450; 364/443
[58] Field of Search ............... 342/352, 356, 357, 358, 342/378, 386–387, 388, 423, 424; 364/443, 449, 452

[56] References Cited

U.S. PATENT DOCUMENTS

| | | | |
|---|---|---|---|
| 4,445,118 | 4/1984 | Taylor et al. | 342/357 |
| 4,485,383 | 11/1984 | Maher | 342/352 |
| 4,578,678 | 3/1986 | Hurd | 342/357 |
| 4,754,465 | 6/1988 | Trimble | 375/1 |
| 4,785,463 | 11/1988 | Janc et al. | 375/1 |
| 4,807,256 | 2/1989 | Holmes et al. | 342/357 |
| 4,821,294 | 4/1989 | Thomas, Jr. | 342/352 |
| 4,928,106 | 5/1990 | Ashjee et al. | 342/352 |
| 5,185,610 | 2/1993 | Ward et al. | 342/357 |

OTHER PUBLICATIONS

S. C. Wu et al., "An Optimal GPS Data Processing Technique" IEEE Plans '92 Position, Location and Nav. Symp. Record, Jan. 1, 1992.

*Primary Examiner*—Gregory C. Issing
*Attorney, Agent, or Firm*—Robert E. Malm

[57] ABSTRACT

The navigation receiver with coupled-tracking channels is intended for use in radio navigation systems based on trilateration wherein the times of arrival of radio signals transmitted by a plurality of ground- or space-based terminals are measured by a user terminal and utilized by the user terminal in calculating its position and orientation. The coupled-tracking navigation receiver periodically measures carrier phase, carrier frequency, modulation phase, and carrier amplitude for all of the signals arriving at the receiving ports of the receiver and periodically estimates the present values of carrier phase, carrier frequency, and modulation phase for all of the received signals, the estimating process utilizing for each parameter estimate the parameter measurements for a plurality of the received signals properly combined in a statistically appropriate manner by taking into account the relative geometry of the line-of-sight paths, receiver clock time dynamics, and dynamics and motion constraints of the receiver platform, thereby obtaining better performance under poor signal reception conditions and more accurate estimates of carrier phase, carrier frequency, and modulation phase for each of the received signals than independent measurements alone could provide. It follows that these more accurate estimates of the basic signal parameters lead to more accurate estimates of platform position and attitude and the rates of change of these quantities.

34 Claims, 25 Drawing Sheets

$$sf.part = \begin{bmatrix} x: \text{x position} \\ \dot{x}: \text{x velocity} \\ y: \text{y position} \\ \dot{y}: \text{y velocity} \\ z: \text{z position} \\ \dot{z}: \text{z velocity} \\ T: \text{clock offset} \\ \dot{T}: \text{clock drift rate} \\ \rho: \text{roll} \\ \dot{\rho}: \text{roll rate} \\ \theta: \text{pitch} \\ \dot{\theta}: \text{pitch rate} \\ \phi: \text{yaw} \\ \dot{\phi}: \text{yaw rate} \end{bmatrix} \qquad 256$$

$$sf.los = \begin{bmatrix} los_1 \\ los_2 \\ los_3 \\ \vdots \\ los_n \end{bmatrix} \qquad 258$$

$$los_i = \begin{bmatrix} \dfrac{\omega_c}{C} d_i \\ \dfrac{\omega_c}{C} \dot{d}_i \\ \text{carrier bias} \\ \text{carrier bias rate} \end{bmatrix} \equiv \begin{bmatrix} iq.phase\_off[i] \\ iq.omega\_off[i] \\ iq.carrier\_bias[i] \\ iq.carrier\_bias\_rate[i] \end{bmatrix} \qquad 260$$

$$X(k) = X_{base}(k) + \Delta X(k) \qquad 262$$

$$X = \begin{bmatrix} X_1 \\ X_2 \\ X_3 \\ \vdots \\ X_n \end{bmatrix} \qquad 264 \qquad X_i = \begin{bmatrix} iq.phase\_off[i] \\ iq.omega\_off[i] \\ iq.carrier\_bias[i] \\ iq.carrier\_bias\_rate[i] \\ iq.aid\_bias[i] \end{bmatrix} \qquad 266$$

$$X_{base}(k) = \Phi_{los}(k) X_{base}(k-1) \qquad 268$$

$$X_{base} = \begin{bmatrix} X_{base,1} \\ X_{base,2} \\ X_{base,3} \\ \vdots \\ X_{base,n} \end{bmatrix} \qquad 270 \qquad X_{base,i} = \begin{bmatrix} iq.phase\_base[i] \\ iq.omega\_base[i] \\ iq.carrier\_bias\_base[i] \\ iq.carrier\_bias\_rate\_base[i] \\ 0 \end{bmatrix} \qquad 272$$

Fig. 5

$$\Delta X(k) = \Phi_{los}(k)\Delta X(k-1) + W(k) \quad 274$$

$$\Delta X = \begin{bmatrix} \Delta X_1 \\ \Delta X_2 \\ \Delta X_3 \\ \vdots \\ \Delta X_n \end{bmatrix} \quad 276$$

$$\Delta X_i \equiv \begin{bmatrix} \text{phie\_}[i] \\ \text{omegae\_}[i] \\ \text{biase\_}[i] \\ \text{bias\_ratee\_}[i] \\ \text{aid\_bias}[i] \end{bmatrix} = \begin{bmatrix} \text{iq.phase\_off}[i] - \text{iq.phase\_base}[i] \\ \text{iq.omega\_off}[i] - \text{iq.omega\_base}[i] \\ \text{iq.bias}[i] - \text{iq.bias\_base}[i] \\ \text{iq.bias\_rate}[i] - \text{iq.bias\_rate\_base}[i] \\ \text{iq.aid\_bias}[i] \end{bmatrix} \quad 278$$

$$\text{se.qe} = \text{cov}\{W(k)W^t(k)\} \quad 281$$

$$\Phi_{los} = \begin{bmatrix} \Phi_{los,1} & & & \\ & \Phi_{los,2} & & \\ & & \ddots & \\ & & & \Phi_{los,n} \end{bmatrix} \quad 282$$

$$\Phi_{los,i} = \begin{bmatrix} 1 & dt & & & \\ 0 & 1 & & & \\ & & 1 & dt & \\ & & 0 & \alpha_{car\_bias} & \\ & & & & \alpha_{aid\_bias} \end{bmatrix} \quad 284$$

Fig. 6

286　$Z\_data = \begin{bmatrix} Z_1 \\ Z_2 \\ Z_3 \\ \vdots \\ Z_n \end{bmatrix}$　　$Z_i = \begin{bmatrix} I_i^+\_data(k) \\ Q_i^+\_data(k) \\ I_i^0\_data(k) \\ Q_i^0\_data(k) \\ I_i^-\_data(k) \\ Q_i^-\_data(k) \\ aid_i(k) \end{bmatrix}$　288

290

$Z\_data(k) = h_k[\Delta X(k)] + V_k$　　$h_k = \begin{bmatrix} h_{k,1} \\ h_{k,2} \\ h_{k,3} \\ \vdots \\ h_{k,n} \end{bmatrix}$　　$h_{k,i} = \begin{bmatrix} I_i^+(k) \\ Q_i^+(k) \\ I_i^0(k) \\ Q_i^0(k) \\ I_i^-(k) \\ Q_i^-(k) \\ aid_i(k) \end{bmatrix}$ 292　　294

296

$sf.r = cov\{V_k V_k^t\}$

Fig. 7

$$I_i^+(k) = iq.am\_[i] * R(phie\_[i] + sf.setpoint\_code[i] + \Delta) *$$
$$(\cos((omegae\_[i] + bias\_ratee\_[i] + sf.setpoint\_freq[i]) * t1[k,i] +$$
$$phie\_[i] + biase\_[i] + sf.setpoint\_phase[i]) -$$
$$\cos((omegae\_[i] + bias\_ratee\_[i] + sf.setpoint\_freq[i]) * t4[k-1,i] +$$
$$phie\_[i] + biase\_[i] + sf.setpoint\_phase[i])) /$$
$$(2 * omegae\_[i] + bias\_ratee\_[i] + sf.setpoint\_freq[i])$$

$$Q_i^+(k) = iq.am\_[i] * R(phie\_[i] + sf.setpoint\_code[i] + \Delta) *$$
$$(\sin((omegae\_[i] + bias\_ratee\_[i] + sf.setpoint\_freq[i]) * t1[k,i] +$$
$$phie\_[i] + biase\_[i] + sf.setpoint\_phase[i]) -$$
$$\sin((omegae\_[i] + bias\_ratee\_[i] + sf.setpoint\_freq[i]) * t4[k-1,i] +$$
$$phie\_[i] + biase\_[i] + sf.setpoint\_phase[i])) /$$
$$(2 * omegae\_[i] + bias\_ratee\_[i] + sf.setpoint\_freq[i])$$

$$I_i^0(k) = iq.am\_[i] * R(phie\_[i] + sf.setpoint\_code[i]) *$$
$$(\cos((omegae\_[i] + bias\_ratee\_[i] + sf.setpoint\_freq[i]) * t1[k,i] +$$
$$phie\_[i] + biase\_[i] + sf.setpoint\_phase[i]) -$$
$$\cos((omegae\_[i] + bias\_ratee\_[i] + sf.setpoint\_freq[i]) * t4[k-1,i] +$$
$$phie\_[i] + biase\_[i] + sf.setpoint\_phase[i])) /$$
$$(2 * omegae\_[i] + bias\_ratee\_[i] + sf.setpoint\_freq[i])$$

$$Q_i^0(k) = iq.am\_[i] * R(phie\_[i] + sf.setpoint\_code[i]) *$$
$$(\sin((omegae\_[i] + bias\_ratee\_[i] + sf.setpoint\_freq[i]) * t1[k,i] +$$
$$phie\_[i] + biase\_[i] + sf.setpoint\_phase[i]) -$$
$$\sin((omegae\_[i] + bias\_ratee\_[i] + sf.setpoint\_freq[i]) * t4[k-1,i] +$$
$$phie\_[i] + biase\_[i] + sf.setpoint\_phase[i])) /$$
$$(2 * omegae\_[i] + bias\_ratee\_[i] + sf.setpoint\_freq[i])$$

Fig. 8

$$I_i^-(k) = iq.am\_[i] * R(phie\_[i] + sf.setpoint\_code[i] - \Delta) *$$
$$(\cos((omegae\_[i] + bias\_ratee\_[i] + sf.setpoint\_freq[i]) * t1[k,i] +$$
$$phie\_[i] + biase\_[i] + sf.setpoint\_phase[i]) -$$
$$\cos((omegae\_[i] + bias\_ratee\_[i] + sf.setpoint\_freq[i]) * t4[k-1,i] +$$
$$phie\_[i] + biase\_[i] + sf.setpoint\_phase[i])) /$$
$$(2 * omegae\_[i] + bias\_ratee\_[i] + sf.setpoint\_freq[i])$$

$$Q_i^-(k) = iq.am\_[i] * R(phie\_[i] + sf.setpoint\_code[i] - \Delta) *$$
$$(\sin((omegae\_[i] + bias\_ratee\_[i] + sf.setpoint\_freq[i]) * t1[k,i] +$$
$$phie\_[i] + biase\_[i] + sf.setpoint\_phase[i]) -$$
$$\sin((omegae\_[i] + bias\_ratee\_[i] + sf.setpoint\_freq[i]) * t4[k-1,i] +$$
$$phie\_[i] + biase\_[i] + sf.setpoint\_phase[i])) /$$
$$(2 * omegae\_[i] + bias\_ratee\_[i] + sf.setpoint\_freq[i])$$

$$\overset{298}{\frown}$$

$$aid = \begin{bmatrix} aid_1 \\ aid_2 \\ aid_3 \\ \vdots \\ aid_n \end{bmatrix} \qquad \overset{300}{\frown}$$

$$aid_i = iq.omega\_off[i] + aid\_bias[i] - iq.omega\_base[i]$$

$$= iq.omegae\_[i] + aid\_bias[i]$$

$$\text{sf.x\_current\_last} = \Phi_{los}(\text{step}) * \text{sf.x\_previous\_last}$$

$$\text{step} = t4[k-1,i] - t4[k-1,i-1]$$

$$\Phi_{los} = \begin{bmatrix} \Phi_{los,1} & & & \\ & \Phi_{los,2} & & \\ & & \ddots & \\ & & & \Phi_{los,n} \end{bmatrix}$$

$$\Phi_{los,i} = \begin{bmatrix} 1 & dt & & & \\ 0 & 1 & & & \\ & & 1 & dt & \\ & & 0 & \alpha_{car\_bias} & \\ & & & & \alpha_{aid\_bias} \end{bmatrix}$$

314

$$\text{sf.p\_current} = \Phi_{los}(\text{step}) * \text{sf.p\_previous} * \Phi_{los}^{t}(\text{step}) + \text{se.qe}$$

Fig. 12

$$sf.res_i = Z_i - sf.z\_hat_i \quad \text{318}$$

$$sf.z\_hat_i = \begin{bmatrix} \hat{I}_i^+(k) \\ \hat{Q}_i^+(k) \\ \hat{I}_i^0(k) \\ \hat{Q}_i^0(k) \\ \hat{I}_i^-(k) \\ \hat{Q}_i^-(k) \\ \hat{aid}_i \end{bmatrix} \quad \text{316}$$

320

$I_i^+(k) = iq.am\_[i] * R(phie\_[i] + sf.setpoint\_code[i] + \Delta) *$
  $(\cos((omegae\_[i] + bias\_ratee\_[i] + sf.setpoint\_freq[i]) * t1[k,i] +$
   $phie\_[i] + biase\_[i] + sf.setpoint\_phase[i]) -$
   $\cos((omegae\_[i] + bias\_ratee\_[i] + sf.setpoint\_freq[i]) * t4[k-1,i] +$
   $phie\_[i] + biase\_[i] + sf.setpoint\_phase[i])) /$
   $(2 * omegae\_[i] + bias\_ratee\_[i] + sf.setpoint\_freq[i])$ $Q_i^+(k) = iq.am\_[i] * R(phie\_[i] + sf.setpoint\_code[i] + \Delta) *$
  $(\sin((omegae\_[i] + bias\_ratee\_[i] + sf.setpoint\_freq[i]) * t1[k,i] +$
   $phie\_[i] + biase\_[i] + sf.setpoint\_phase[i]) -$
   $\sin((omegae\_[i] + bias\_ratee\_[i] + sf.setpoint\_freq[i]) * t4[k-1,i] +$
   $phie\_[i] + biase\_[i] + sf.setpoint\_phase[i])) /$
   $(2 * omegae\_[i] + bias\_ratee\_[i] + sf.setpoint\_freq[i])$

Fig. 13

$$\hat{I}_i^0(k) = iq.am\_h[i] * R(phie\_h[i] + sf.setpoint\_code[i]) *$$
$$(\cos((omegae\_h[i] + bias\_ratee\_h[i] + sf.setpoint\_freq[i]) * t1[k,i] +$$
$$phie\_h[i] + biase\_h[i] + sf.setpoint\_phase[i]) -$$
$$\cos((omegae\_h[i] + bias\_ratee\_h[i] + sf.setpoint\_freq[i]) * t4[k-1,i] +$$
$$phie\_h[i] + biase\_h[i] + sf.setpoint\_phase[i])) /$$
$$(2 * omegae\_h[i] + bias\_ratee\_h[i] + sf.setpoint\_freq[i])$$

$$\hat{Q}_i^0(k) = iq.am\_h[i] * R(phie\_h[i] + sf.setpoint\_code[i]) *$$
$$(\sin((omegae\_h[i] + bias\_ratee\_h[i] + sf.setpoint\_freq[i]) * t1[k,i] +$$
$$phie\_h[i] + biase\_h[i] + sf.setpoint\_phase[i]) -$$
$$\sin((omegae\_h[i] + bias\_ratee\_h[i] + sf.setpoint\_freq[i]) * t4[k-1,i] +$$
$$phie\_h[i] + biase\_h[i] + sf.setpoint\_phase[i])) /$$
$$(2 * omegae\_h[i] + bias\_ratee\_h[i] + sf.setpoint\_freq[i])$$

$$\hat{I}_i^-(k) = iq.am\_h[i] * R(phie\_h[i] + sf.setpoint\_code[i] - \Delta) *$$
$$(\cos((omegae\_h[i] + bias\_ratee\_h[i] + sf.setpoint\_freq[i]) * t1[k,i] +$$
$$phie\_h[i] + biase\_h[i] + sf.setpoint\_phase[i]) -$$
$$\cos((omegae\_h[i] + bias\_ratee\_h[i] + sf.setpoint\_freq[i]) * t4[k-1,i] +$$
$$phie\_h[i] + biase\_h[i] + sf.setpoint\_phase[i])) /$$
$$(2 * omegae\_h[i] + bias\_ratee\_h[i] + sf.setpoint\_freq[i])$$

$$\hat{Q}_i^-(k) = iq.am\_h[i] * R(phie\_h[i] + sf.setpoint\_code[i] - \Delta) *$$
$$(\sin((omegae\_h[i] + bias\_ratee\_h[i] + sf.setpoint\_freq[i]) * t1[k,i] +$$
$$phie\_h[i] + biase\_h[i] + sf.setpoint\_phase[i]) -$$
$$\sin((omegae\_h[i] + bias\_ratee\_h[i] + sf.setpoint\_freq[i]) * t4[k-1,i] +$$
$$phie\_h[i] + biase\_h[i] + sf.setpoint\_phase[i])) /$$
$$(2 * omegae\_h[i] + bias\_ratee\_h[i] + sf.setpoint\_freq[i])$$

$$\hat{aid}_i = iq.omegae\_h[i] + aid\_bias\_h[i]$$

Fig. 14

$$sf.h\_[1] = [[sf.h_1] \quad 0 \quad 0 \quad \cdots \quad 0]$$

$$sf.h\_[2] = [0 \quad [sf.h_2] \quad 0 \quad \cdots \quad 0]$$

$$sf.h\_[3] = [0 \quad 0 \quad [sf.h_3] \quad 0 \quad \cdots \quad 0]$$

$$\vdots$$

$$sf.h\_[n-2] = [0 \quad \cdots \quad 0 \quad [sf.h_{n-2}] \quad 0 \quad 0]$$

$$\vdots$$

$$sf.h\_[n] = [0 \quad 0 \quad \cdots \quad 0 \quad [sf.h_n]]$$

324

326

$$[sf.h_i] = [grad_{sf.x} h_{k,i}]_{\text{evaluate derivative at sf.x\_current\_last}}$$

328

$$\begin{bmatrix}
\partial I_i^+ / \partial phie\_[i] & \partial I_i^+ / \partial omegae\_[i] & \partial I_i^+ / \partial biase\_[i] & \partial I_i^+ / \partial bias\_ratee\_[i] & 0 \\
\partial Q_i^+ / \partial phie\_[i] & \partial Q_i^+ / \partial omegae\_[i] & \partial Q_i^+ / \partial biase\_[i] & \partial Q_i^+ / \partial bias\_ratee\_[i] & 0 \\
\partial I_i^0 / \partial phie\_[i] & \partial I_i^0 / \partial omegae\_[i] & \partial I_i^0 / \partial biase\_[i] & \partial I_i^0 / \partial bias\_ratee\_[i] & 0 \\
\partial Q_i^0 / \partial phie\_[i] & \partial Q_i^0 / \partial omegae\_[i] & \partial Q_i^0 / \partial biase\_[i] & \partial Q_i^0 / \partial bias\_ratee\_[i] & 0 \\
\partial I_i^- / \partial phie\_[i] & \partial I_i^- / \partial omegae\_[i] & \partial I_i^- / \partial biase\_[i] & \partial I_i^- / \partial bias\_ratee\_[i] & 0 \\
\partial Q_i^- / \partial phie\_[i] & \partial Q_i^- / \partial omegae\_[i] & \partial Q_i^- / \partial biase\_[i] & \partial Q_i^- / \partial bias\_ratee\_[i] & 0 \\
0 & 1 & 0 & 0 & 1
\end{bmatrix}$$

$$sf.k\_[i] = sf.p\_current * sf.h\_[i]^t *$$

330

$$[sf.h\_[i] * sf.p\_current * sf.h\_[i]^t + sf.r\_[i]]^{-1}$$

332

$$sf.p\_previous = (I - sf.k\_[i] * sf.h\_[i]) * sf.p\_current$$

Fig. 16

334 sf.x_current_last = sf.x_current_last + sf.k_[i] * sf.res[i]

336 sf.x_base_last$_i$ = sf.x_base_last$_i$ + sf.x$_i$ where, $$sf.x\_base\_last_i = \begin{bmatrix} iq.phase\_base\_last\_[i] \\ iq.omega\_base\_last\_[i] \\ iq.carrier\_base\_last\_[i] \\ iq.carrier\_bias\_rate\_base\_last\_[i] \\ 0 \end{bmatrix}$$

and, $$sf.x_i = \begin{bmatrix} phie\_h[i] \\ omegae\_h[i] \\ biase\_h[i] \\ bias\_ratee\_h[i] \\ aid\_bias\_h[i] \end{bmatrix}$$

338

$$sf.x\_current\_last_i = \begin{bmatrix} 0 \\ 0 \\ 0 \\ 0 \\ aid\_bias\_h[i] \end{bmatrix}$$

Fig. 17

340 $\begin{cases} sf.x\_current\_next = \Phi_{los}(step) * sf.x\_current\_last \\ \\ sf.x\_previous\_last = sf.x\_current\_last \\ \\ sf.x\_previous\_next = sf.x\_current\_next \\ \\ \text{where the time step for the ith channel is given by:} \\ \\ step = t4(k,i) - t4(k-1,i) \end{cases}$ 342 $\begin{cases} sf.x\_base\_temp = \begin{bmatrix} sf.x\_base\_temp_1 \\ sf.x\_base\_temp_2 \\ \vdots \\ sf.x\_base\_temp_n \end{bmatrix} \\ \\ sf.x\_base\_temp_j = \Phi_{los}(step[j]) * sf.x\_base\_last_j \\ \\ step[j] = t4[k,i] - t4[k-1,j] \end{cases}$ 344 $\begin{cases} sf.x\_whole\_current = sf.x\_current\_next + sf.x\_base\_temp \\ \\ sf.x\_whole\_current = \begin{bmatrix} sf.whole\_current[1] \\ sf.whole\_current[2] \\ \vdots \\ sf.whole\_current[n] \end{bmatrix} \\ \\ sf.whole\_current\_[i] = \begin{bmatrix} iq.phase\_hat[i] \\ iq.omega\_hat[i] \\ iq.bias\_h[i] \\ iq.bias\_rate\_h[i] \\ iq.aid\_bias\_h[i] \end{bmatrix} \end{cases}$

Fig. 18

$$360 \quad se.qe = \begin{bmatrix} QL_{11} & 0 & 0 & QL_{12} & 0 & 0 & \cdots & QL_{1n} & 0 & 0 \\ 0 & QB & 0 & 0 & 0 & 0 & \cdots & 0 & 0 & 0 \\ 0 & 0 & QR & 0 & 0 & 0 & \cdots & 0 & 0 & 0 \\ QL_{21} & 0 & 0 & QL_{22} & 0 & 0 & \cdots & QL_{2n} & \vdots & \vdots \\ 0 & 0 & 0 & 0 & QB & 0 & & 0 & & \\ 0 & 0 & 0 & 0 & 0 & QR & & 0 & & \\ \vdots & \vdots & \vdots & \vdots & \vdots & & \ddots & \vdots & & \\ QL_{n1} & 0 & 0 & QL_{n2} & 0 & 0 & \cdots & QL_{nn} & 0 & \\ 0 & 0 & 0 & 0 & \cdots & & & 0 & QB & 0 \\ 0 & 0 & 0 & 0 & \cdots & & & & 0 & QR \end{bmatrix}$$

$$362 \quad se.qe\_los = \begin{bmatrix} QL_{11} & QL_{12} & QL_{13} & \cdots & QL_{1n} \\ QL_{21} & QL_{22} & QL_{23} & \cdots & QL_{2n} \\ QL_{31} & QL_{32} & QL_{33} & \cdots & QL_{3n} \\ \vdots & \vdots & \vdots & \vdots & \vdots \\ QL_{n1} & QL_{n2} & QL_{n3} & \cdots & QL_{nn} \end{bmatrix}$$

$$364 \quad = se.h * se.qs * se.h^t$$

Fig. 20

$$QB = \begin{bmatrix} QB_{11} & QB_{12} \\ QB_{21} & QB_{22} \end{bmatrix} \quad 372$$

where $QB_{11} = q_{car\_bias} * (\alpha_{car\_bias} * dt - 1.5 + 2 * \exp(-\alpha_{car\_bias} * dt) -$
$\quad \exp(-2 * \alpha_{car\_bias} * dt)/2) / (\alpha_{car\_bias}^3)$ $QB_{12} = q_{car\_bias} * (1 - \exp(-\alpha_{car\_bias} * dt)) * (1$
$\quad - \exp(-\alpha_{car\_bias} * dt)) / (2 * \alpha_{car\_bias}^2)$

374

$QB_{21} = QB_{12}$ $QB_{22} = q_{car\_bias} / (2 * \alpha_{car\_bias}) * (1 - \exp(-\alpha_{car\_bias} * dt * 2))$

376

$QR = (q_{aid\_bias} / (2 * \alpha_{aid\_bias})) * (1 - \exp(-2 * dt * \alpha_{aid\_bias}))$ where dt is the correlator time interval $$378 \quad \text{alpha\_filt} = \begin{bmatrix} \alpha_x \\ \alpha_y \\ \alpha_z \\ \alpha_{clock} \\ \alpha_{roll} \\ \alpha_{pitch} \\ \alpha_{yaw} \\ \alpha_{car\_bias} \\ \alpha_{aid\_bias} \end{bmatrix} \quad 380 \quad \text{q\_filt} = \begin{bmatrix} q_x \\ q_y \\ q_z \\ q_{clock} \\ q_{roll} \\ q_{pitch} \\ q_{yaw} \\ q_{car\_bias} \\ q_{aid\_bias} \end{bmatrix}$$

Fig. 22

$$\text{sf.x\_control}_i = \begin{bmatrix} \text{phase\_base}[i] + \text{carrier\_bias\_base}[i] - \text{sf.setpoint\_phase}[i] \\ \text{omega\_base}[i] + \text{carrier\_bias\_rate\_base}[i] - \text{sf.setpoint\_freq}[i] \\ \text{phase\_base}[i] - \text{setpoint\_code}[i] \\ 0 \end{bmatrix}$$

400

$$\text{sf.setpoint}_i = \begin{bmatrix} \text{sf.setpoint\_phase}[i] \\ \text{sf.setpoint\_freq}[i] \\ \text{sf.setpoint\_code}[i] \\ 0 \end{bmatrix}$$

NAVIGATION RECEIVER WITH COUPLED SIGNAL-TRACKING CHANNELS

BACKGROUND OF INVENTION

The invention relates generally to radio navigation systems and more particularly to systems based on trilateration wherein radio signals transmitted by a plurality of ground- or space-based terminals are received by a user terminal and utilized by the user terminal in calculating its position and orientation.

Trilateration navigation systems are based on the geometrical principle that the position of a point in space is uniquely determined by the distances of the point from three other suitably-positioned reference points whose locations in space are known. Radio navigation systems based on this principle utilize transmitting terminals at the reference points which transmit signals in which a common time reference is embedded. The user terminal, by measuring the time of arrival of the reference terminal signals with respect to the same common time reference, can determine its range to each of the reference transmitting terminals and thereby its position. If the user terminal does not have a clock of sufficient accuracy for independently keeping track of the common time reference, it can, by measuring the time of arrival of signals from four reference transmitters, also keep its clock synchronized to the common time reference of the reference transmitters.

The principle can be extended to the measurement of the attitude of a platform by utilizing receiving ports at a plurality of points on the platform and measuring the locations of these points relative to the reference terminals.

In general, the navigation data desired includes not only position and attitude but also the rates of change of these parameters, i.e. linear velocity and angular velocity. To achieve these goals, not only must the carrier modulation be tracked but also the carrier phase and frequency for each of the received signals.

User receiver systems for trilateration radio navigation systems are comprised of an antenna, a receiver "front end" for selecting and amplifying the frequency band of interest together with "down" converters for translating the radio frequency band of interest to an intermediate frequency band more suitable for subsequent signal processing, and signal processors for extracting the desired information from the received signals. Commonly today, the received signals are translated to baseband where in-phase (I) and quadrature (Q) signal samplers and digitizers followed by digital signal processors are used to extract range and range rate data from the signals.

The extraction of range and range rate data from the I and Q samples of each received signal begins with a correlation process. The I and Q samples are multiplied by reference signal samples, the reference signal being a locally-generated replica of the transmitted signal, and the resulting products are accumulated with prior products to obtain smoothed I and Q values with greatly reduced noise and interference.

The smoothed I and Q samples are further processed to obtain information as to the offset, or misalignment, between the carrier phase, carrier frequency, and modulation phase of a received signal and the corresponding parameters of the corresponding locally-generated reference signal. Two additional functions performed at this stage are estimation of received signal amplitude and recovery of any auxiliary data modulation that may have been impressed upon the carrier. Within the conventional receiver, all of these processing steps are carried out separately for each received signal.

Tracking loops are provided that provide estimated values of carrier phase, carrier frequency, and modulation phase. After processing the current set of smoothed I and Q data, the tracking loops are updated resulting in updated estimates of carrier phase and frequency and modulation phase relative to the local clock in the receiver. At the same time, the auxiliary quantities of signal amplitude and carrier data bits are updated. Prior to the start of the next correlation interval the updated estimates of carrier phase and frequency and modulation phase are used to derive a corrective command signal that is used to adjust the carrier phase and frequency and the modulation phase of the reference signal generator in the correlation processor for the purpose of ensuring adequate signal correlation during the subsequent correlation interval.

An example of the type of navigation system described above is the NAVSTAR global positioning system (GPS) developed by the United States Government. The NAVSTAR system consists of a constellation of 18 to 24 orbiting satellites that transmit pseudorandom ranging signals from which users with appropriate equipment can obtain three-dimensional location, velocity, and timing information anywhere on or near the surface of the earth. Details concerning NAVSTAR/GPS are given in NAVIGATION: *Journal of the Institution of Navigation*, Volume 25, Number 2, December, 1978 (entire issue).

Conventional navigation receivers process the plurality of received signals independently, Thus, conventional navigation receivers fail to realize their theoretical performance potential by not taking advantage of the collective information contained in the plurality of received signals in the processing of each of the individual signals.

BRIEF SUMMARY OF INVENTION

The navigation receiver with coupled signal-tracking channels operates on a platform within line-of-sight range of a plurality of spatially-distributed transmitters with positions known to the receiver. The transmitters transmit modulated sinusoidal carriers that are particular functions of time as maintained by synchronized transmitter clocks. The navigation receiver, knowing the time associated with the transmission of the signals and measuring the reception time by its own clock synchronized to the transmitter clocks, can determine its range to each transmitter. By measuring the Doppler shifts in carrier frequency, the receiver can determine the rate of change of range to each transmitter. From this data the position and rate of change of position of the receiver and its platform can be determined. If the platform is equipped with multiple receiving ports, the receiver can also determine platform attitude and rate of change of attitude by including the additional line-of-sight paths in the measurement process.

The present invention pertains to the signal processor in the receiver which periodically measures carrier phase, carrier frequency, modulation phase, and carrier amplitude for all of the signals arriving at the platform receiving ports and periodically estimates the present values of carrier phase, carrier frequency, and modulation phase for all of the received signals, the estimating process utilizing for each parameter estimate the parameter measurements for a plurality of the received signals properly combined in a statistically appropriate manner by taking into account the relative geometry of the line-of-sight paths, receiver clock time dynamics, and dynamics and motion constraints of the receiver platform, thereby obtaining more accurate estimates of carrier phase, carrier frequency, and modulation phase for each of the received signals than independent measurements alone could provide. It follows that these more accurate estimates of the basic signal parameters lead to more accurate estimates of platform position and attitude and the rates of change of these quantities.

One object of the invention is to obtain more accurate and continuous updates of real-time position, velocity, attitude, and attitude rate and the recovery of auxiliary data modulation down to a lower signal threshold by using a complete model for line-of-sight dynamics in such a manner that the carrier phase, carrier frequency, and modulation phase can be more reliably tracked during periods of intermittent signal attenuation, noise interference, multipath interference, and signal blockage and outage.

Another object of the invention is to provide improved performance for post-processed precise carrier applications such as land, marine, or air survey by employing the above described techniques of signal processing for combining wideband signal data from several locations.

BRIEF DESCRIPTION OF DRAWINGS

FIG. 5 provides the definitions of the navigation state vector and the LOS state vector.

FIG. 6 describes how the base and incremental LOS states evolve with discrete time and defines the LOS state transition matrix.

FIG. 7 defines the input data vector to the coupled-filter signal processor and shows how the data vector can be modeled as a non-linear function of the incremental LOS state vector.

FIG. 8 further defines the non-linear function introduced in FIG. 7.

FIG. 9 continues the definition of the non-linear function introduced in FIG. 7 and relates the velocity aiding term supplied by the external velocity sensor to certain components of the incremental LOS state vector.

FIG. 12 details the initial operations carried out by the coupled-filter signal processor in performing the filter gain adjust routine.

FIG. 13 continues the detailing of the operations carried out by the coupled-filter signal processor in performing the filter gain adjust routine.

FIG. 14 continues the detailing of the operations carried out by the coupled-filter signal processor in performing the filter gain adjust routine.

FIG. 16 completes the detailing of the operations carried out by the coupled-filter signal processor in performing the filter gain adjust routine.

FIG. 17 details the initial operations carried out by the coupled-filter signal processor in performing the IQ combiner routine.

FIG. 18 completes the detailing of the operations carried out by the coupled-filter signal processor in performing the IQ combiner routine.

FIGS. 20, 21, 22, and 23 continue the detailing of the operations carried out by the coupled-filter signal processor in performing the vehicle position and attitude evaluator routine.

FIG. 25 details the operations carried out by the coupled-filter signal processor in performing the reference generator command setup routine.

DESCRIPTION OF THE PREFERRED EMBODIMENT

The preferred embodiment of the radio navigation receiver with coupled signal-tracking channels will be described in the context of its application in a satellite-referenced radio navigation system as exemplified by NAVSTAR/GPS.

A number of variants of a commonly used signal tracking technique used in GPS and other time-of-arrival navigation systems have been described in patents and other publications over the years. All such variants contain an antenna and receiver front end for selecting the general frequency band of the navigation system and down-converter stages followed by additional frequency-selective elements for further reducing noise and interference. In the case of multiple receiving antennas, parallel sets of these components are employed. In present-day receiver art it is now common practice to sample in-phase and quadrature mix-down outputs at baseband and to carry out the remaining signal processing operations with digital hardware and microprocessors. For convenience in exposition, a similar digital implementation will form the basis for the description of the preferred embodiment of the present invention. It will be understood by one skilled in the art that the principles of the invention can be applied with equal effectiveness to receiver implementations based on combinations of analog and digital techniques.

Figure 1:
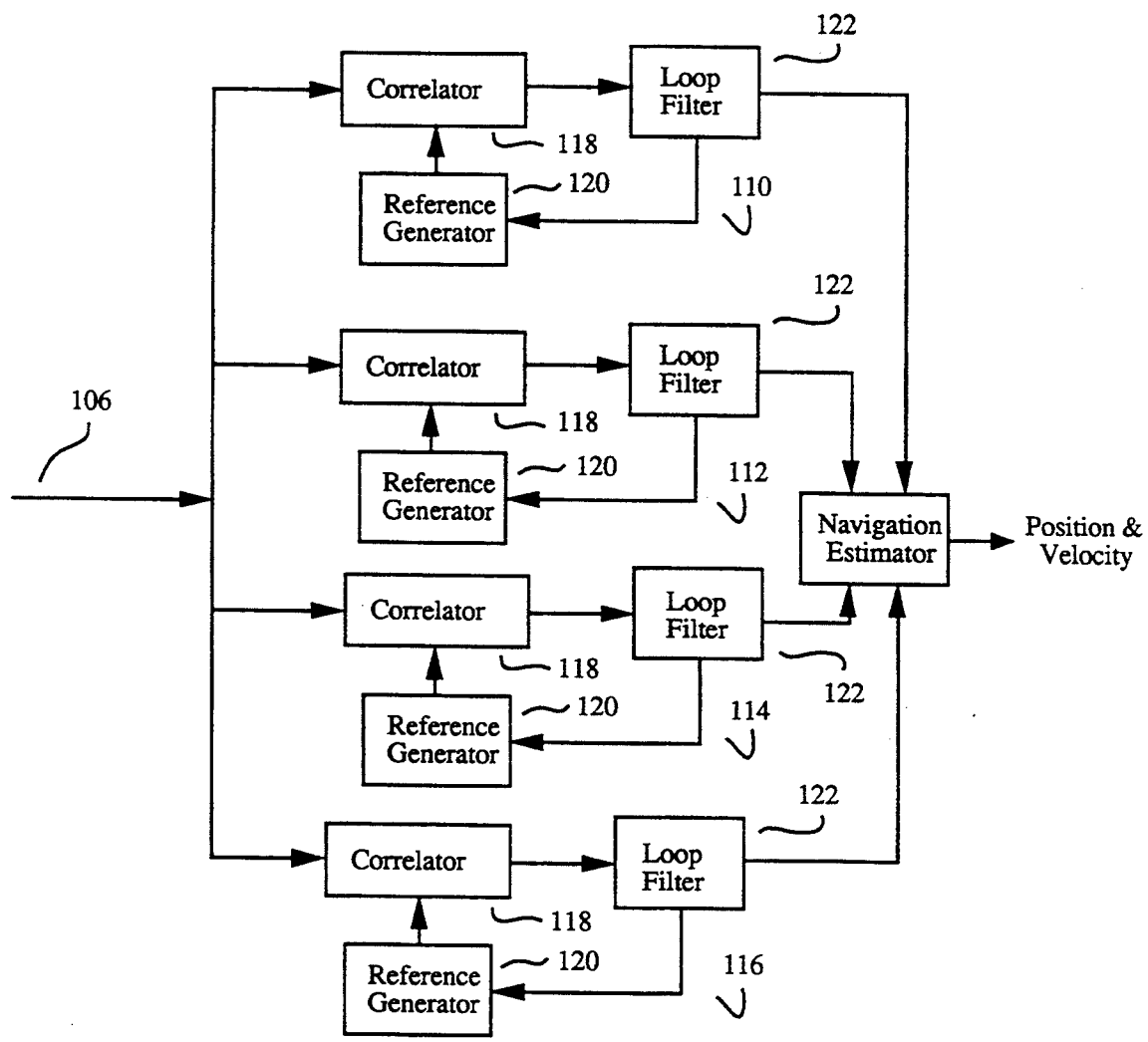
FIG. 1 is a functional block diagram of a signal processing apparatus for a conventional navigation receiver showing the decoupled signal-tracking structure characteristic of these receivers.

The demodulator portion of a conventional receiver for a single-antenna user terminal is shown in FIG. 1. The digital representations of the in-phase and quadrature signal samples 106 are routed to four correlator channels 110, 112, 114, and 116, one for each of the four reference transmitter signals. Each correlator channel consists of a correlator 118, a reference generator 120, and a loop filter 122. The samples of the composite received signal are multiplied in correlator 118 by samples of a reference signal supplied by the reference generator 120 and summed over the correlation interval to obtain smoothed I and Q values with greatly reduced noise and interference.

The reference signal is a replica of the signal broadcast by the particular reference transmitter that is associated with the particular correlator channel. In the case of GPS, the reference generator samples are generated by digital hardware consisting of spread spectrum code generators and carrier phase generators.

The I and Q values resulting from signal correlation are further processed in loop filter 122 to obtain information as to the offset, or misalignment, between the incoming carrier phase and frequency and modulating code and the corresponding reference signal quantities. Two additional functions performed by the loop filter 122 are the estimation of received signal amplitude and recovery of any auxiliary data modulation that may be impressed upon the carrier. Within the conventional receiver, all of these processing steps are carried out separately for each path defined by a particular reference transmitter and a particular user antenna.

For carriers upon which the data has been impressed by phase-shift keying, the I and Q correlator outputs are typically processed by a loop filter 122 with a Costas loop. If the carrier is further modulated at the transmitter by a spread-spectrum signal, the I and Q correlator outputs are typically also processed with a delay-lock loop or tau-dither loop. New I and Q data causes the loop filter 122 to update its estimates of carrier phase and frequency and modulating code, relative to the local clock in the receiver, and forward these values to the navigation estimator 150. At the same time, the auxiliary quantities of signal amplitude and carrier data bits are updated. Prior to the start of the next correlation interval the updated estimates of carrier phase and frequency and modulating code offset are used by loop filter 122 to derive a corrective command signal to reference generator 120 for the purpose of ensuring adequate signal correlation during the next correlation interval.

Further details concerning conventional navigation receivers of the type discussed above and the signal processing techniques employed therein can by found in U.S. Pat. Nos. 4,445,118, 4,468,793, 4,485,383, 4,578,678, 4,754,465, 4,785,463, 4,821,294, and 4,928,106. The above patents are incorporated in this specification by reference.

It should be noted that in the prior art shown in FIG. 1 all of the processing steps are carried out in a decoupled fashion. There is no interaction between channels assigned to different transmitters. In essence, this type of structure ignores statistical correlations in path dynamics and penalizes signal tracking performance, particularly during signal attenuations or while operating in the presence of strong interference. By coupling the signal-tracking channels together as shown in FIG. 2, it is possible to achieve superior signal-tracking performance under adverse reception conditions.

Figure 2:
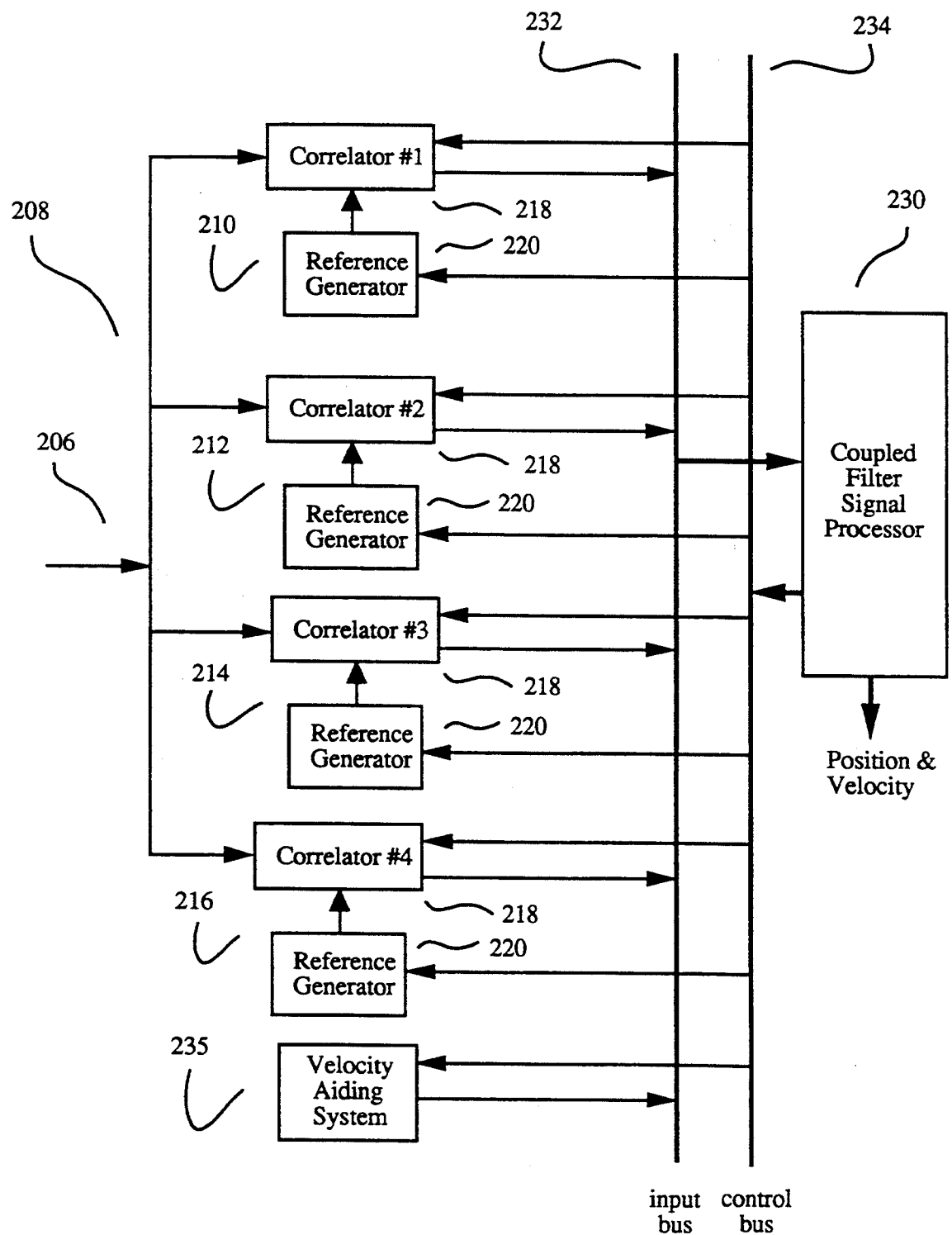
FIG. 2 is a functional block diagram of the signal processing apparatus for the preferred embodiment of the present invention showing the coupled signal-tracking structure.

The demodulator portion of the preferred embodiment of a navigation receiver having coupled signal-tracking channels is shown in FIG. 2. The front end of the receiver is conventional and is fully described in the patents incorporated by reference. As was mentioned previously, in present-day receiver art it is now common practice to sample in-phase and quadrature mix-down outputs at baseband and to carry out the remaining signal processing operations with digital hardware and microprocessors. These sampled in-phase and quadrature outputs from a conventional receiver front-end form the inputs 206 to the correlation system 208.

The correlator system 208 comprises the four correlator channels 210, 212, 214, and 216 where each of the correlator channels consists of a correlator 218 and a reference generator 220. The correlators 218 and the reference generators 220 are essentially the same as those used in the conventional decoupled receiver demodulators illustrated in FIG. 1. Details concerning the design of these receiver elements can also be found in the aforementioned patent references.

The essence of the invention is contained within the coupled filter processor 230 which in combination with the correlator system 208 produce navigational data more effectively as compared to the conventional uncoupled demodulator structure of FIG. 1.

The set of I and Q data from the correlator system 208 provides the basis for calculations performed by the coupled filter processor 230. In the GPS navigation context, a fresh data set is typically made available on the data bus 232 at 20-millisecond intervals. The coupled filter processor, unlike a conventional phase-lock loop, Costas loop, or delay-lock loop, merges the data set in such a fashion that commands fed back to each reference generator 220 over the control bus 234 are the result of the set of input bus data from all correlator channels during the previous correlation interval.

It should be noted that when multiple receiving antennas are employed, each antenna would feed its own receiver front end and its own correlation system 208. All correlation systems 208 would communicate with the coupled filter processor 230 by means of the data bus 232 and the control bus 234.

The velocity aiding system 235 provides measurements of platform velocity as projected onto the set of available LOS paths between satellites and platform receiving antennas which are utilized by the coupled-filter signal processor 230 in cases of extreme signal blockage. In the case of a land vehicle these velocity components would typically be derived from a flux-gate compass and speedometer. In the case of a marine vehicle the velocity aiding information would typically be derived from a flux-gate compass and water speed indicator. In the case of an aircraft these components might be derived from an inertial measurement unit (IMU). The velocity aiding system communicates with the signal processor by means of the data bus 232 and the control bus 234.

Figure 3:
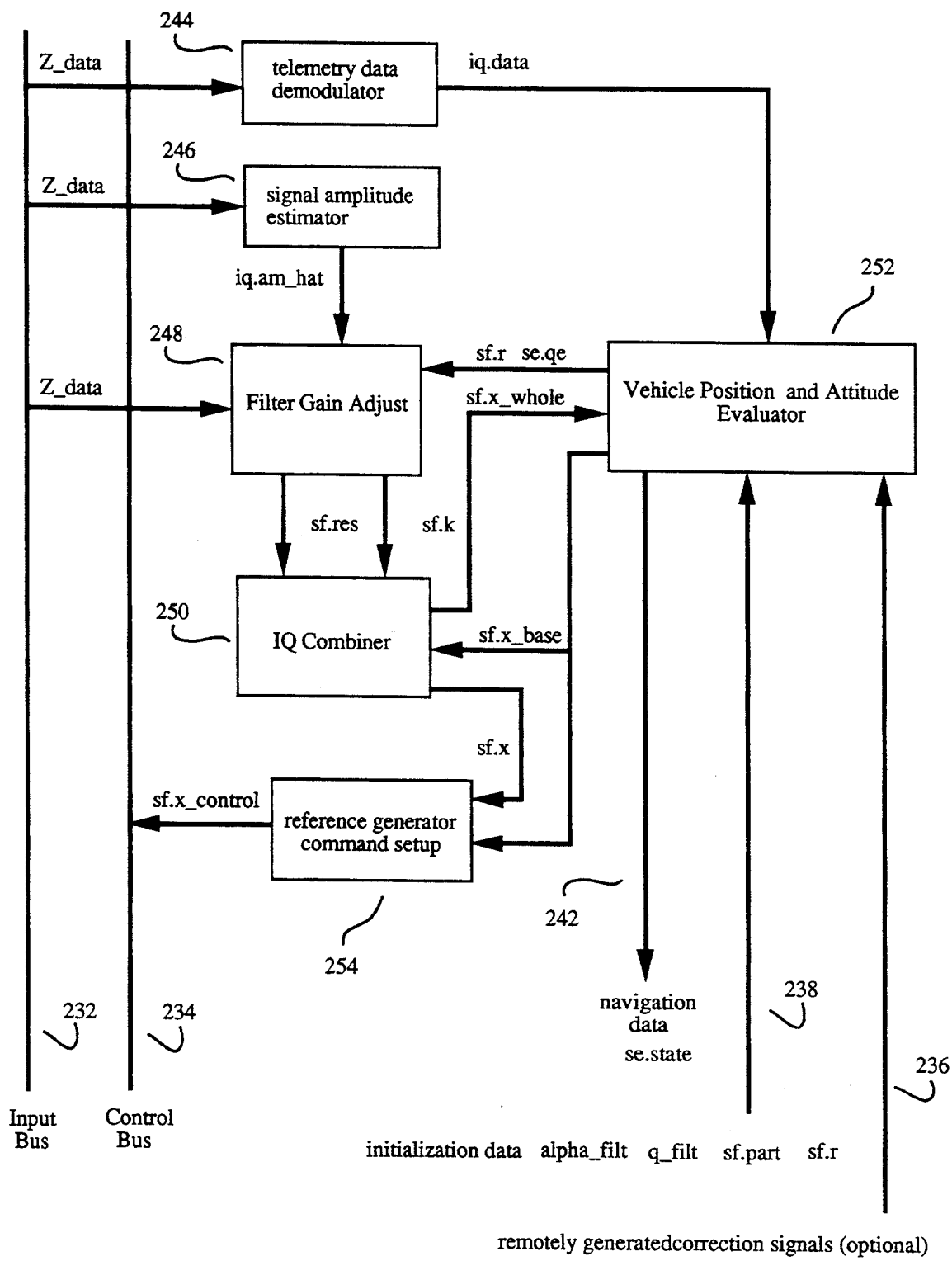
FIG. 3 is an illustration of the functional relationships of the software routines that control the operation of the coupled filter processor in the preferred embodiment of the invention.

The preferred embodiment of the coupled filter processor 230 is one or more microprocessors of the Intel 80486 or Motorola 68040 variety connected to the correlator system 208 by data bus 232 and control bus 234 and performing the software routines identified in FIG. 3.

Typically at 20-millisecond intervals the raw data vector Z_data from the correlator system 208 and the velocity aiding system 235 is sent over the data bus 232 for processing. The format of this data is typically 8 bits for each component of the data vector. For each correlator channel there are typically six data components having to do with the measured correlations and a seventh component that is the projection of platform velocity onto the appropriate line-of-sight path. The correlation components are known in the art as (1) punctual code I and Q outputs, (2) delay code I and Q outputs, and (3) advanced code I and Q outputs, corresponding to the accumulated correlation values for in-phase and quadrature phase references and punctual, advance, and delay code references respectively.

The data vector Z_data is processed by the coupled filter signal processor 230 (FIG. 2) in accordance with the six routines identified in FIG. 3, the results of the processing being a set of commands conveyed to the reference generators 220 (FIG. 2), typically at 20-millisecond intervals, by means of the control bus 234. Each reference generator command is typically a 32-bit word comprised of values for reference signal phase and frequency and modulation phase at the beginning of the next correlation interval. The array of reference generator commands is denoted by the symbol sf.x_control.

Other inputs to the coupled-filter signal processor 230 (FIG. 2) are the remotely-generated correction signals 236 from a differential correction station and the system initialization data 238.

The remotely-generated correction signals 236 are particularly important in compensating for uncertainties in phase of the received signals. In GPS such uncertainties are caused by deviations of the actual orbital model parameters from their nominal broadcast values, by drifts in the satellite clocks, and by unknown ionospheric and tropospheric delays. The deviations in carrier phase and frequency and modulation phase of the received signals are seen nearly identically by a fixed-site calibration station and the platform using the navigation system, and drift estimates may be broadcast to the platform where they can be removed by the coupled-filter signal processor. This mode of operation, known in the GPS art as differential GPS operation (DGPS) and described fully in the literature under industry standard format RTCM-104, release 2.0, (Radio Technical Commission for Maritime Services, P.O. Box 19087, Washington, D.C. 20036) is implemented in the present invention by applying the corrections directly within the signal tracking process rather than downstream in the navigation calculations as is customary in the art.

The system initialization data 238 consists of time constants alpha_filt and process noise constants q_filt describing platform motion, parameters specifying measurement noise levels sf.r expected from the correlator system 208 (FIG. 2), and initial estimates of platform navigation states sf.part.

The outputs of the coupled-filter signal processor 230 (FIG. 2) are platform navigation data (or states) 242. For the case of a platform having a single antenna, these states are typically easting, northing, and altitude and the rates of change of these quantities. Additionally, the signal processor may estimate the offset between the internal system clock and the time reference of the navigation system. These outputs are of the same type as a conventional navigation system.

For the case of a platform having multiple antennas, platform orientation and motion states may be provided as outputs. Typically these are platform roll, pitch, and yaw angles with respect to the local east-north-up datum and the rates of change of these angles.

Figure 4:
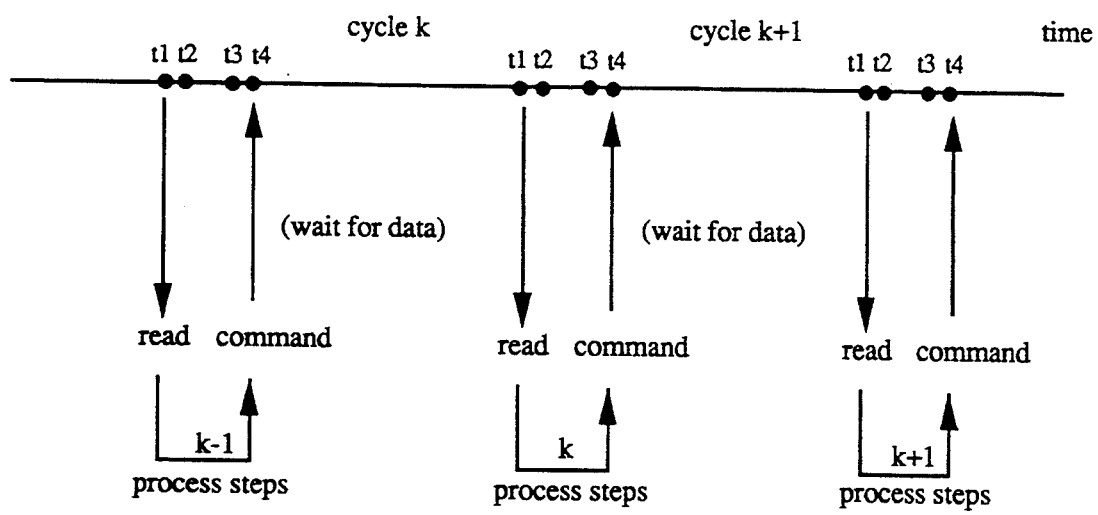
FIG. 4 shows the timing of the signal processing operations performed in the signal processing apparatus of the preferred embodiment of the present invention.

The scheduling of interactions between the correlator system 208 (FIG. 2) and the coupled-filter signal processor 230 (FIG. 2) is illustrated in FIG. 4. The figure depicts three frames of interactions: the (k−1)'th frame, the k'th frame, and the (k+1)'th frame. Each frame begins at a time denoted by t1 with an interrupt signal provided by the correlation system to the signal processor that signals the availability of data on the data bus 232 from one of the correlator channels 210, 212, 214, and 216 (FIG. 2). The signal processor reads the data during the period t1−t2, performs the routines identified in FIG. 3 during the period t2−t3, and transfers the resulting command data to the correlator system over control bus 234 (FIG. 2) during the interval t3−t4.

The command data consists of best estimates of carrier phase, carrier frequency offset, and modulating code offset to be used in adjusting the reference generator of the correlator channel in the correlator system. These estimates take into account satellite motion, DGPS biases, velocity aiding (if available), and dispersive propagation effects which are manifested by a difference in the LOS distance derived from the carrier phase measurement and the LOS distance derived from the modulating code offset measurement.

The next correlation interval begins at t4 and ends at the next t1 when the next processing cycle begins.

Correlation intervals are normally locked to the telemetry data bit transitions resulting in asynchronous correlation intervals between correlator channels. Specifically, during each system cycle, i.e. the time period required to service all correlator channels, the signal processor services the correlator channels on a "first come, first-served" basis. After servicing a correlator channel interrupt, the signal processor services the next correlator channel to generate an interrupt. The processing steps performed are identical for each correlator channel. A system cycle time for GPS is approximately 20 milliseconds.

The operations performed by the coupled-filter signal processor 230 (FIG. 2) and the routines in which they appear are as follows:

| Step | Operation | Routine |
|---|---|---|
| 1 | Read correlator data. | sig. amp. est. |
| 2 | Estimate signal amplitude. | sig. amp. est. |
| 3 | Recover telemetry data bit. | telem. data demod. |
| 4 | Extrapolate LOS state from most recently updated channel. | filter gain adjust |
| 5 | Update residuals an evaluate signal quality. | filter gain ajust |
| 6 | Update filter gains and covariance. | filter gain adjust |
| 7 | Update LOS state vector for time t4. | IQ combiner |
| 8 | Update current channel base vector for time t4. | IQ combiner |
| 9 | Extrapolate LOS state vector to next time t4. | IQ combiner |
| 10 | Extrapolate base and whole states to next time t4. | IQ combiner |
| 11 | Update navigation state for next time t4. | vehicle pos. & att. |
| 12 | Find satellite positions and velocities at time of transmission. | vehicle pos. & att. |
| 13 | Estimate LOS phase and frequency for next correlation interval. | vehicle pos. & att. |
| 14 | Correct LOS values with differential correction. | vehicle pos. & att. |
| 15 | Initialize new base values for phase and frequency, this channel. | vehicle pos. & att. |
| 16 | Update satellite status and correlator channel assinments. | vehicle pos. & att. |
| 17 | Compute commands for current channel. | ref. setup |

Each pass through the listed steps corresponds to the reading of the correlation data from one correlator channel and the writing of the commands to that correlator channel.

The first three steps performed by the coupled-filter signal processor 230 (FIG. 2) are encompassed by the telemetry data demodulator routine 244 (FIG. 3) and the signal amplitude estimator routine 246 and are concerned with reading data off the data bus, estimating signal amplitude, and recovering telemetry data bits.

Steps 4 through 6 are performed in the filter gain adjustment routine 248. In this routine, which must be performed promptly enough to enable the receiver to adapt to rapidly changing signal conditions, the statistically best weighting for measurement residuals is developed. Filter residuals are computed, signal quality is evaluated, and fresh gains are computed.

Steps 7 through 10 are performed in the IQ combiner routine 250. Unlike the conventional GPS receiver, where receiver channel measurement outputs (whole carrier phase and frequency and modulating code phase) are independently generated within each channel, without reference to line-of-sight geometery, the present invention processes the raw IQ measurements of all channels in a statistically optimum fashion, using line-of-sight geometry and inter-path process correlations. Moreover, whenever a new set of IQ data is read from a given correlator channel, the state estimates for all correlator channels are updated. The resulting estimates of correlator state are used to update whole estimates of LOS quantities, and these are extrapolated to the start time for the next correlation interval. These whole values are fed to the vehicle position and attitude evaluator routine 252.

In the vehicle position and attitude evaluator routine 252 steps 11 through 16 are performed. The extrapolated LOS values and linearized geometry are used to generate the least-squared-error estimate of the navigation states. These data may be sent to an external display or storage device, depending upon the application. Next, the estimated satellite positions for signals received during the next correlation interval are estimated, and the "best" estimates of transmission delay and rate of change of transmission delay are computed. These estimates are adjusted using differential correction data, if such data is available. Finally, the housekeeping operations associated with scheduling the reception of signals from a newly-visible satellite and searching for a satellite that was hidden from view for a long period are performed.

The transmission delay and rate of change of transmission delay estimates are transformed in the reference generator command setup routine 254 (step 17) into carrier phase and frequency and modulating code phase adjustment commands for the reference generator 220 (FIG. 2) of the correlation channel being processed. In this transformation process, the ideal LOS transmission delay and delay rates are compensated for slowly changing biases that may exist between carrier phase and modulating code phase measurements. Also, the commands sent to the current correlator channel may be offset to a specified set-point.

Underlying the design of the coupled-filter signal processor 230 (FIG. 2) is the familiar state variable modeling approach for describing dynamical systems with random excitation. The structure of the model is defined in FIGS. 5 through 9.

In the navigation platform frame of reference the quantities of interest are those comprising the navigation state vector sf.part which describe the platform's position, attitude, and motion in an earth-fixed coordinate system and those comprising the LOS state vector sf.los which describe the same quantities in terms of the distances and the rates of change of the distances of the individual platform receiving antennas to each of the satellites. A "state" corresponds to a particular set of values for the state variables.

The navigation state vector and the LOS state vector are defined in FIG. 5. The navigation state vector 256, in a fully configured system with multiple platform-mounted receiving antennas, represents a six-degree-of-freedom model together with platform clock offset and offset rate resulting in 14 state variables. Translations and rotations are defined for a body-fixed coordinate system referenced to an earth-fixed frame of reference, the latter typically being the east-north-up system. The navigation state drives the LOS state and a locally linear transformation is used to carry small changes observed in the navigation state into the LOS state and vice versa.

In the case of four satellites (or reference transmitters) and a platform having a single receiving antenna, the LOS state vector 258 consists of the four vector components 260 where the index i identifies a particular satellite-to-platform path, $d_i(t)$ is the line-of-sight distance to the i'th satellite at time t, $\omega_c$ is the nominal carrier transmit frequency, C is the speed of light, $\dot{d}_i(t)$ is the rate of change of $d_i(t)$, carrier bias is the offset between the observed modulating code and the carrier phase, and carrier bias rate is the rate of change of carrier bias.

The quantity iq.phase_off[i] denotes the total path length of the i'th path at time t expressed in terms of phase of the carrier. The quantity iq.omega_off[i] denotes the rate of change of the path length of the i'th path. The last two terms of each vector component 260 are included to model biases between the free-space line-of-sight path length and the path length measured by accumulated carrier phase. In general, a carrier phase observation will be offset from the true path length due to the carrier cycle ambiguity as well as dispersive propagation phenomena caused by the ionosphere. These slowly-varying states are estimated at the same time as the free-space quantities.

The LOS state vector X(k) 262 is expressed as a sum of two parts, the base value $X_{base}(k)$ and the incremental part X(k). The base value is the value sent to a correlator channel at the start of its new correlation interval. The incremental value is the difference between the whole LOS state and the specified base value. The LOS state vector 264, in the case of four satellites and a single receiving antenna, consists of the four vector components 266 where the index i identifies a particular satellite-platform path. Each of the vector components 266 is comprised of the free-space terms 260 together with the velocity aiding bias term iq.aid_bias[i]. As previously discussed, the signal processor accommodates velocity aiding inputs from the velocity aiding system 235 (FIG. 2). Aiding devices can have large biases which are detrimental to system operation if uncompensated. Velocity aiding input biases are estimated and compensated for in the IQ combiner routine 250 (FIG. 3).

The base LOS state evolves with discrete time in accordance with equation 268. The base LOS state vector 270, in the case of four satellites and a single receiving antenna, consists of the four vector components 272. Each of the vector components 266 is comprised of the free-space terms 260 together with the zero velocity aiding bias term iq.aid__bias[i]. The state transition matrix $\Phi_{los}$ will be discussed below in connection with FIG. 6.

The incremental LOS state vector 276, shown for the case of n line-of-sight paths, consists of the five vector components. Equation 278 follows from equations 262, 264, 266, 268, 270, and 272. The quantity W(k) models the change on each LOS path occurring during one correlation interval. These changes, observed as changes in carrier phase, carrier frequency, carrier bias, carrier bias rate, and aid bias, are described by the covariance matrix se.qe 281. The structure of se.qe plays a central role in coupling of the tracking channels and is defined in detail in FIGS. 20, 21, and 22, to be discussed below.

The state transition matrix appearing in equations 268 and 274 is defined by expressions 282 and 284. Within each partition of the transition matrix are three constants. The first of these, $T_c$, is simply the correlation interval duration. The carrier bias time constant $\alpha_{car\_bias}$ is derived from the process correlation time of the assumed carrier bias rate phenomenon, and the aid bias time constant $\alpha_{aid\_bias}$ is established from a specified model for the drift rates of the external velocity sensor which is part of the velocity aiding system 235 (FIG. 2).

The structure of the observation model is given in FIGS. 7 through 9. In the material that follows it is assumed that four correlator channels are tracking four signals that were propagated over four LOS paths.

The input data vector to the coupled-filter signal processor 230 (FIG. 2) is defined by the expression 286 in FIG. 7. Each of the four vector components 288 consists of seven components. The first six are outputs from the associated correlator 218 (FIG. 2) and the seventh is the output from the velocity aiding system. The seven components are read from the data bus 232 (FIGS. 2 and 3) by the signal processor 230.

The data vector can be modeled as a nonlinear function 290 of the incremental LOS state vector $\Delta X$. This dependency on only the incremental LOS state results from the signal processor command sent back to each channel at the start of its correlation interval which corrects the base value of the LOS state.

The quantity $h_k$ 292 consists of four vector components 294. The seven components of each of the vector components 294 are defined in FIGS. 8 and 9. The quantity $V_k$ is the noise voltage that contaminates the correlation measurements.

The correlation measurement noise covariance matrix 296 is initialized with values obtained from the hardware specification of the correlator system 208 (FIG. 2).

The parameters sf.setpoint__phase, sf.setpoint__freq, and sf.setpoint__code that appear in the equations shown in FIGS. 8 and 9 are the desired offsets between the reference signal phase, frequency, and code values and the actual received values at the start of correlation interval k+1. R() is the modulating code autocorrelation function, and $\Delta$ denotes the offset delay between the on-time reference code of the GPS correlator and its advanced and delayed code replicas. The quantity iq.am is the peak received signal amplitude. Time tag value t4[k−1, i] denotes the start of the k'th correlation interval, channel i. Time tag value t1[k, i] denotes the end time of the k'th correlation interval, channel i.

The velocity aiding input 298 (FIG. 9), measured with respect to the base value of the LOS rate iq.omega__base, consists of the four vector components 300. The quantity aid__bias[i] is the bias in the velocity value supplied by the velocity aiding system 235 (FIG. 2).

The signal processing routines identified in FIG. 3 will now be described in the chronological order of performance.

Figure 10:
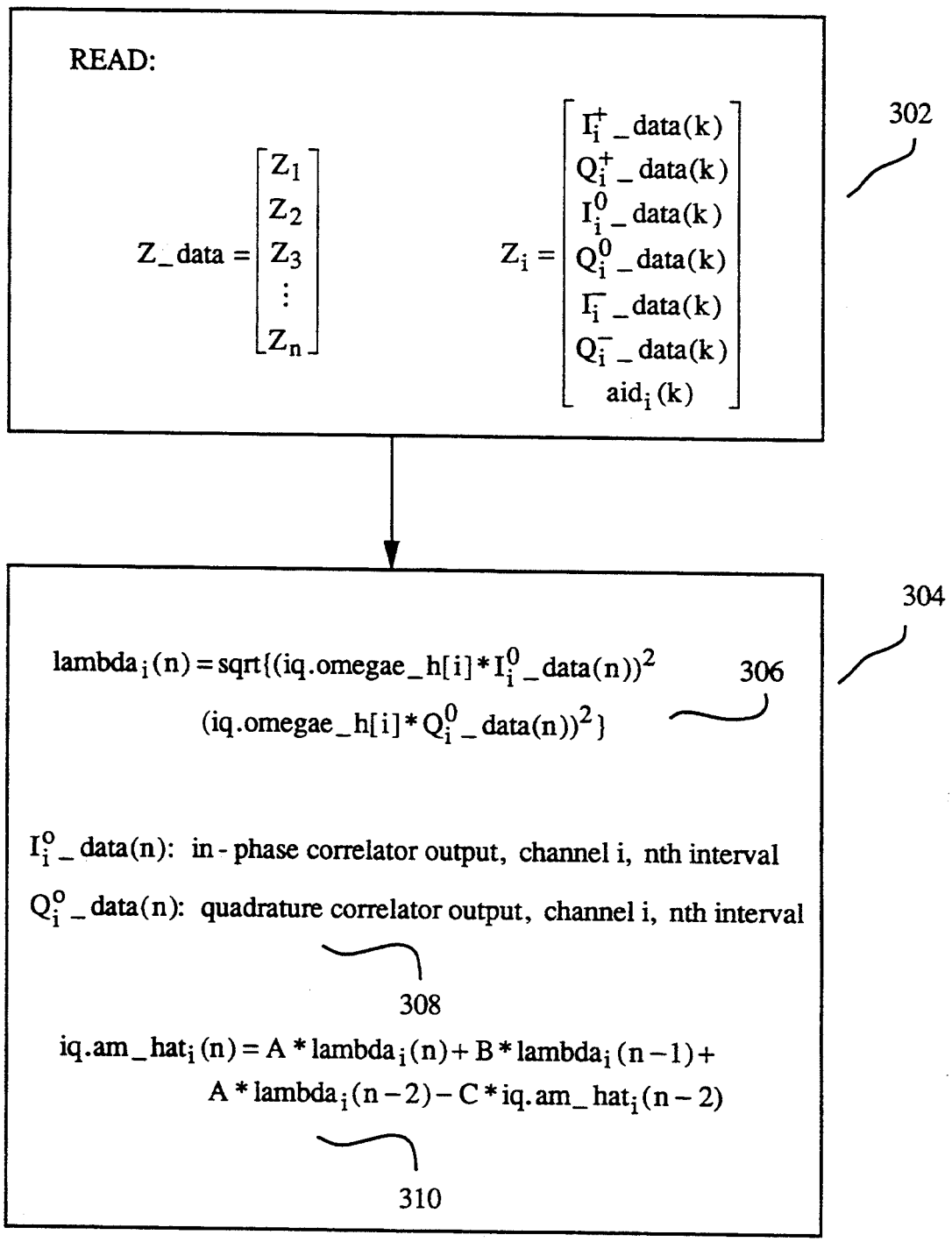
FIG. 10 details the operations carried out by the coupled-filter signal processor in performing the signal amplitude estimator routine.

The signal amplitude estimator routine 246 (FIG. 3) causes the coupled-filter signal processor 230 (FIG. 2) to read the raw correlator data vector Z__data and to produce estimates of signal amplitude iq.am__hat. In order for the signal processor to properly adapt to changing signal quality conditions as observed at the platform receiving antenna(s), it is necessary that signal amplitude estimates be updated at a rapid rate, typically every 10 milliseconds. The two processing steps are detailed in FIG. 10.

The first step 302 consists of reading the most recent data values from the correlator system 208 (FIG. 2) and the velocity aiding system 235 (FIG. 2) from the data bus 232 (FIGS. 2 and 3).

The second step 304 consists of computing an updated amplitude estimate for each satellite line-of-sight path. To this end the I and Q values for the on-time code reference correlator are scaled, squared, and summed and the square root of the result is extracted as indicated by equation 306. The data elements being processed are identified by the expressions 308. The current signal processor estimate of the frequency state for the i'th correlator channel iq.omeae__h[i] is obtained from the estimate sf.x__current__last of the incremental LOS state vector 278 (FIG. 6) for the channel currently being processed and referenced to time t4 of that channel. The estimate sf.x__current__last is made in the IQ combiner routine 250 (FIG. 3).

The amplitude estimates are updated by passing the lambda values through a digital "infinite inpulse response" smoothing filter. The updated amplitude estimate for the i'th channel at cycle n is given by the equation 310.

Figure 11:
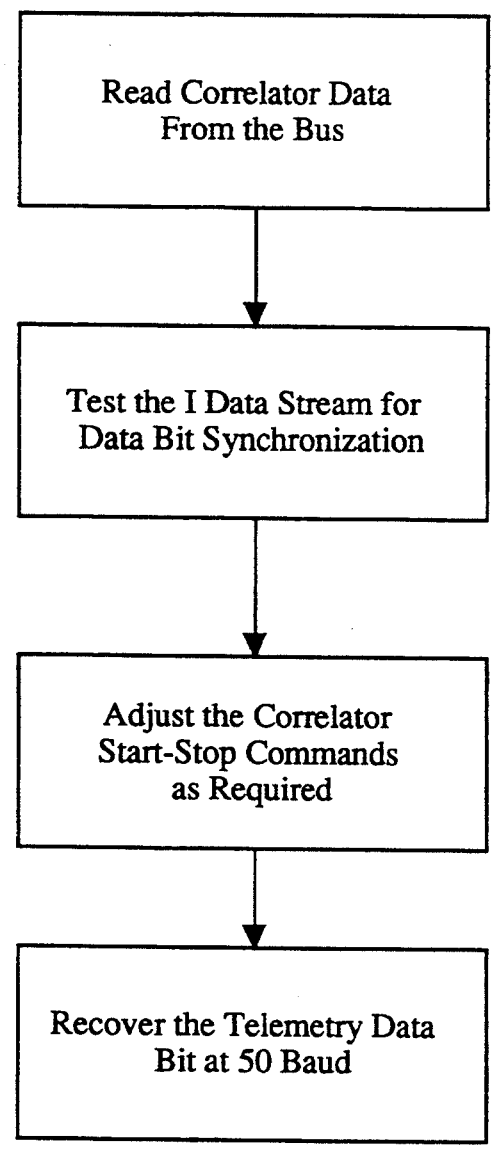
FIG. 11 identifies the operations carried out by the coupled-filter signal processor in performing the telemetry data demodulator routine.

In step 3 the signal processor performs the telemetry data demodulator routine 244 (FIG. 3) and produces one or more telemetry data bits. The operations performed are indicated in FIG. 11. In the case of phase-shift-keyed (PSK) telemetry data modulation, the punctual I data components of the Z__data vector 286 (FIG. 7) are tested for sign. A plus sign is mapped into a binary one, a minus sign is mapped into a binary zero, and the raw Z__data vector 286 is then stripped of the data telemetry bits by inverting the sign of all components of a given correlator channel for which a binary zero was declared, prior to further processing of Z__data. The recovered data telemetry bits, which for GPS are received at 50 baud, are collected in buffers and parity is checked. The data bits are tested for word and frame synchronization in a conventional fashion as described for GPS in Interface Control Document ICD-200 (available from the NAVSTAR GPS Joint Program Office, United States Air Force Systems Command). Also, as described in this same document, the telemetry data is then used to compute satellite positions and drift correction parameters associated with satellite clock drift.

Periodically, the start and stop intervals t4 and t1 of each correlator channel will need adjustment so as to remain in approximate alignment with the edges of the PSK telemetry data. A standard bit synchronizer based upon the concept of the widesense cyclostationary process is incorporated for this purpose. (See Moghazy, Maral, and Blanchard, "Digital PCM Bit Synchronizer and Detector", IEEE Transactions on Communication Systems, Vol. Com-28, August 1980, pp. 1197–1200.) In the present embodiment this synchronization adjustment function is implemented by squaring values of the "on-time" I data stored in 288, and averaging these squared values over typically 100 correlation intervals to obtain a control signal which is responsive to the error in timing of correlation interval start relative to the time of data bit arrival at the receiver. This control signal is then used to periodically adjust the correlation interval start.

The Z_data vector produced by the correlator system 208 (FIG. 2) is used in the IQ combiner routine 250 (FIG. 3) to update the estimate sf.x of the true incremental LOS state vector ΔX 278 (FIG. 6). This key step can be performed using any one of a number of standard techniques, among them being the extended Kalman filter. A central part of any such method is the computation of the filter gain matrix which carries the measurement residuals into updated state estimates.

The signal processor accomplishes this function by means of the filter gain adjust routine 248 (FIG. 3). It takes as input the signal amplitude estimates iq.am_hat 310 (FIG. 10), the nominal correlation measurement noise covariance matrix sf.r 296 (FIG. 7) that is user-supplied 238 (FIG. 3), and the path state noise covariance matrix se.qe 280 (FIG. 6) and produces the filter gain matrix sf.k. The detailed steps are shown in FIGS. 12 through 16.

As discussed earlier, the signal processor services correlator channels on a "first come, first served" basis. Before computing the residual errors in the LOS state estimates for the channel currently being served, the "best" estimate of the LOS state based on the previously-served channel at its t4 time must be extrapolated to the t4 time of the current channel. It is important to note that the present invention, unlike conventional navigation receivers, performs an update of the LOS states of all correlator channels whenever fresh data becomes available from any of its correlator channels.

The extrapolation of the LOS state from the most recently updated correlator channel (step 4) is described in FIG. 12 by equations 312. The vector sf.x_previous_last is the estimate of the LOS state following the most recently processed channel referenced to time t4 for that channel. The vector sf.x_current_last is the estimate of the LOS state for the channel currently being processed referenced to time t4 for that channel. The state transition matrix $\Phi_{los}$ was discussed earlier in connection with FIG. 6.

The filter state error covariance matrix sf.p is a product of the standard Kalman filter methodology. The error covariance matrix based on the previously-serviced channel at its t4 time is also extrapolated in step 4 to the t4 time of the current channel. The extrapolation process is specified in FIG. 12 by equation 314. The quantity sf.p_previous is the error covariance matrix at time t4[k−1, i−1] following the update of the LOS state at the last t4 time for the previous channel. The quantity sf.p_current is the error covariance matrix at time t4[k−1, i]. The error covariance matrix is extrapolated with the same time step as used in extrapolating the LOS state 312. The quantity se.qe 280 (FIG. 6) was defined earlier.

Figure 15:
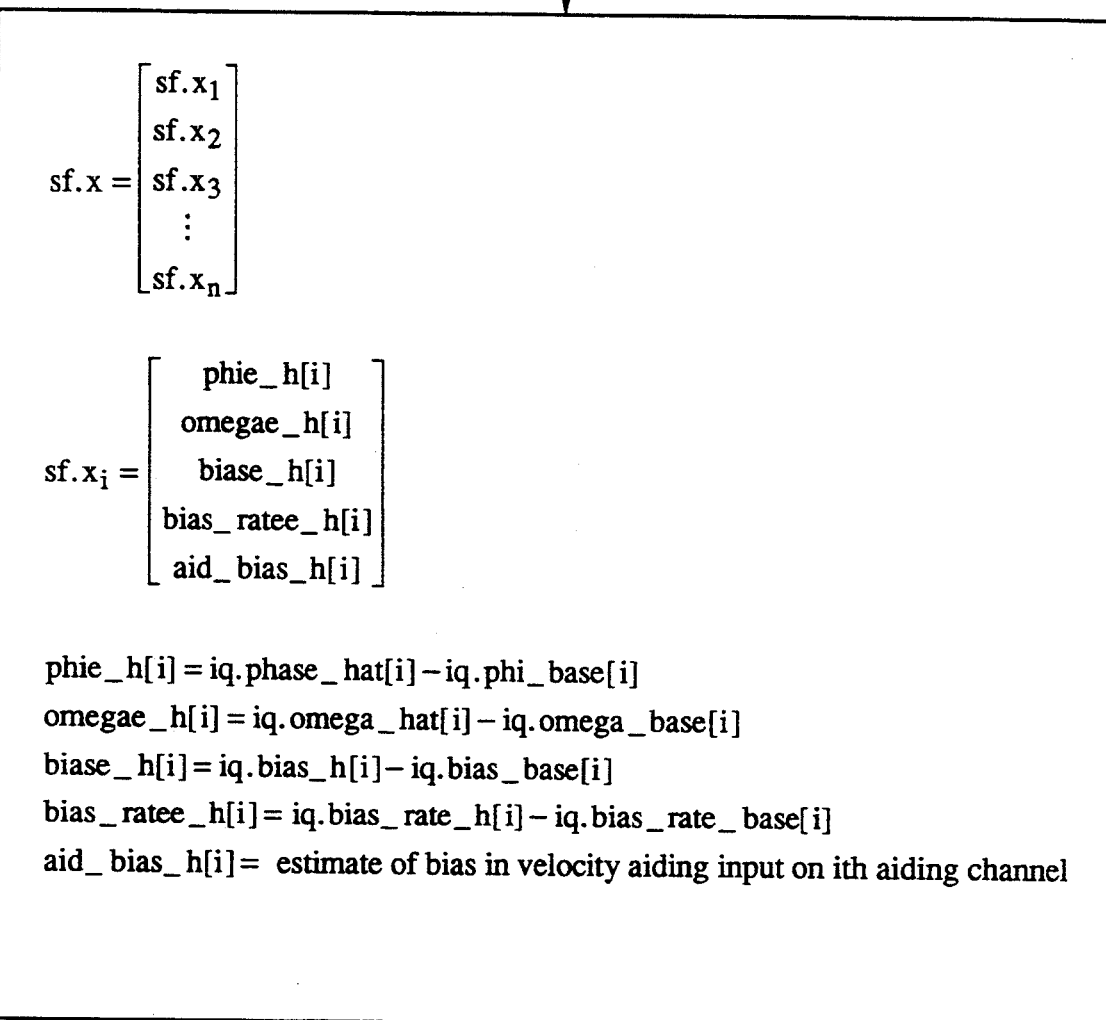
FIG. 15 continues the detailing of the operations carried out by the coupled-filter signal processor in performing the filter gain adjust routine.

Step 5 is detailed in FIGS. 13, 14, and 15. The predicted data sf.z_hat 316 from the correlator system 208 (FIG. 2) and the velocity aiding system 235 (FIG. 2) are subtracted from the current raw data Z_data to form the measurement residual vector sf.res 318 as indicated in FIG. 13. At this time the seven residual components associated with the current channel are examined for reasonableness. A channel with residuals above a rejection threshold is noted and its "bad residual count" is incremented.

There are two responses to a residual above threshold corresponding to whether the bad residual count has exceeded a limit or not:

(a) If the bad residual count has exceeded the limit, the current measurement is rejected which is most easily accomplished by increasing sf.r to sf.r_high, a quantity that is set to a large value, say 100,000. Then, this channel is removed from the list of active channels and is processed separately in a decoupled mode until residuals on this channel improve;

(b) If the bad residual count has not exceeded the limit, the current measurement is rejected as in the above case, but the channel is kept in the coupled mode.

The seven predicted data values 316 for the current LOS path are defined by the equations 320 in FIG. 13 and all of the equations in FIG. 14. The quantities appearing in the equations are obtained from the estimate of the LOS state for the current channel sf.x_current_last 312 (FIG. 12) as shown in FIG. 15. The definition of the LOS state sf.x shown in FIG. 15 follows that given previously for the true LOS state 276, 278 (FIG. 6).

The correlator system 208 (FIG. 2) is highly non-linear in the operating region of interest and is linearized about the current estimate of the LOS state vector in step 6. Linearization is accomplished by taking the gradient of the analytical expressions for the I and Q correlator outputs with respect to the full set of LOS state variables. There are up to five LOS state variables defined for each line-of-sight path: phase and frequency error, modulating code offset and offset rate, and LOS velocity aiding input bias. For the i'th channel, the array of derivatives in the gradient are evaluated at sf.x_current_last and stored in array sf.h_i.

The gradient terms for the four-channel correlator system 208 (FIG. 2) are defined by expressions 324, 326, and 328 in FIG. 16. The array 324 has dimensions 7×20 with three null partitions of dimensions 7×5.

The equation 330 for the Kalman filter gain sf.k_[i] for the i'th channel utilizes the current value for the correlator measurement noise covariance matrix, either sf.r_[i] if the residual is normal or sf.r_high_[i] if the residual is above the reasonableness threshold. The values in sf.r_[i] and sf.r_high_[i] are supplied as part of the initialization data 238 (FIG. 3). The overall LOS state covariance matrix extrapolated to time t4[k−1, i], sf.p_current, in accordance with the standard Kalman filter design method.

The quantity sf.p_current is the filter state error covariance matrix extrapolated from the t4 time of the previously-updated correlator channel. The quantity sf.r_[i] is the correlation measurement noise covariance matrix for the batch of seven measurement components for the current channel.

The dimensions of the arrays are 20×7 for sf.k__[i], 20×20 for sf.p__current, 7×20 with three zero partitions for sf.h__[i], and 7×7 for sf.r__[i].

Following the filter gain computation, the filter state error covariance matrix sf.p is updated 332 using the standard Kalman filter methodology. The updating reflects the improved estimation error for all correlator states following the processing of the current batch of correlator I and Q data together with the velocity aiding data. The quantity I in equation 332 is the identity matrix having dimensions 20×20. It should be noted that the previously-calculated value of sf.p__previous is overwritten with the newly-calculated value. It is also important to note that the new filter state error covariance matrix reflects improvement not only in the estimate for the LOS state for the current correlator channel but also in the estimates for the LOS states of all channels. This result is in marked contrast to the traditional prior-art decoupled signal processing scheme.

The IQ combiner routine 250 (FIG. 3) shown in FIGS. 17 and 18 utilizes as inputs the residuals for the current channel sf.res__[i] and the filter gain matrix for the current channel sf.k__[i]. The output that results from the performance of the routine is the estimate of the LOS state sf.x for all LOS paths.

In step 7 the LOS state vector estimate sf.x (FIG. 15) referenced to the t4 time of the current channel is updated by multiplying the measurement residual vector sf.res by the filter gain matrix sf.k in accordance with equation 334 shown in FIG. 17.

Following the updating of the LOS state vector estimate in step 7, the components of the LOS state base vector sf.base__last associated with the current channel are updated in step 8 by adding the updated LOS state values for the current channel to the LOS state base values for the current channel in accordance with equation 336. The term sf.x__base__last denotes the base values employed in each correlator channel for the k−1 system cycle, the cycle that has just ended.

The LOS state values for the current channel, except for the velocity-aiding bias state, are then reset to zero in accordance with equation 338.

In step 9 the LOS state vector is next extrapolated to the start time t4[k, i] of the next correlation interval for the current channel, and the current channel is then defined to be the previous channel in accordance with equations 340 shown in FIG. 18. The vector sf.x__previous__next is the LOS state estimate following the most recently completed channel referenced to the next t4 time for that channel. The vector sf.x__current__next is the LOS state estimate referenced to the next t4 time for the current channel.

In step 10 the base LOS values for the correlator system are then extrapolated to the current channel's next correlation start t4[k, i] using the appropriate time step for each correlator channel in accordance with equations 342. The term sf.x__base__temp denotes extrapolations of sf.x__base to arbitrary time tags in the k'th cycle.

The predicted whole values sf.x__whole__current for LOS state estimates referenced to time t4[i, k] are formed by adding the updated and extrapolated LOS state vector to the __base__temp values for each channel as indicated by equations 344.

The vehicle position and attitude evaluator routine 252 (FIG. 3) takes as initialization input: (1) the user-supplied initial value for platform position, velocity, attitude, and attitude rate sf.part; (2) the user-supplied initial values for the correlation measurement noise covariance matrix sf.r; (3) the user-supplied values for platform velocity and platform rotation rate random process correlation times alpha__filt; and (4) the user-supplied values for platform velocity and platform rotation rate random process state noise disturbance power q__filt.

Quantities generated by the platform position and attitude evaluator routine 252 (FIG. 3) and utilized by other routines are: (1) the computed path state noise covariance matrix se.qe for the currently-defined satellite-to-platform antenna paths; and (2) the estimates of LOS whole phase and frequency values sf.x__base.

The details of the routine are shown in FIGS. 19 through 24.

In step 11 the linearization of the LOS path geometry is accomplished. The linearization relates small changes in platform navigation states (i.e. translation and rotation of the body-fixed coordinate system) to changes in the Euclidean distances and rates of change of distances measured between each satellite and the platform antenna(s). The linearization is found by taking the gradient of the set of distance vectors with respect to the navigation state vector and evaluating the resulting gradient matrix functions for the most recent estimate of the platform state vector se.state.

Figure 19:
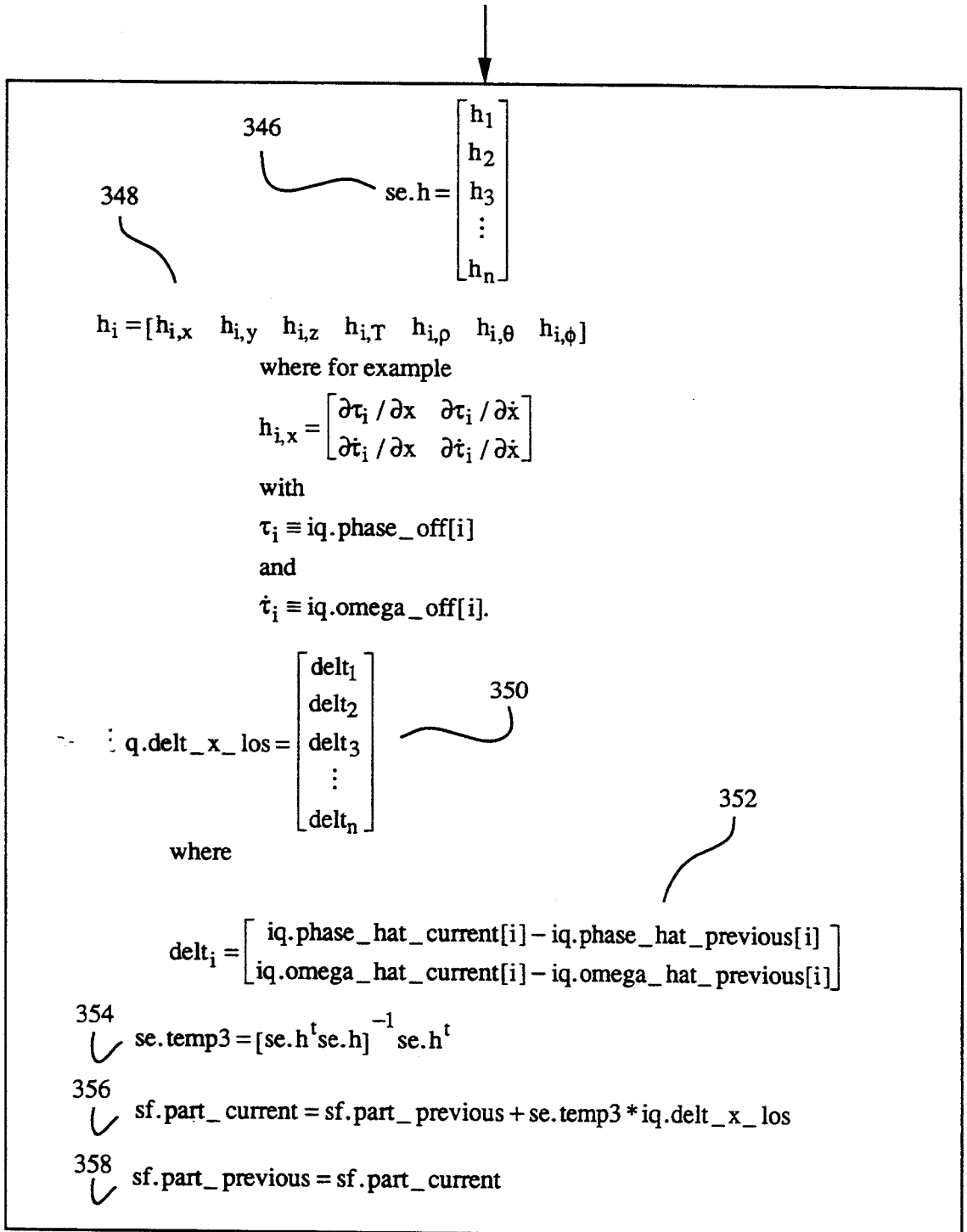
FIG. 19 details the initial operations carried out by the coupled-filter signal processor in performing the vehicle position and attitude evaluator routine.

The line-of-sight linearization matrix 346 and the derivatives to be evaluated 348 are shown in FIG. 19.

As a prelude to the computation of the latest estimate of the platform navigation vector, the offset vector iq.delt__x__los is obtained by subtracting the previous values of whole carrier phase and frequency from the current values for all channels, as indicated by equations 350 and 352.

Next, the pseudo-inverse matrix se.temp3 that relates changes in the line-of-sight quantities to the changes in navigation quantities is computed in accordance with equation 354. As is well known in the literature (see Gelb, *Applied Optimal Estimation*, MIT Press, 1974), the pseudo-inverse provides an optimal estimate in the least-squared-error sense for an overdetermined linear system of equations. This principle provides the basis for equation 356 which relates the current value sf.part__current of the platform navigation state to the previous value sf.part__previous. In accordance with equation 358, sf.part__current becomes sf.part__previous in anticipation of the next updating of sf.part.

As mentioned earlier, the central theme of the invention is the proper coupling of the signal tracking functions between all satellites being received. The quantity which permits this statistically optimum approach is the path state noise covariance matrix se.qe. The calculation of se.qe is accomplished by matrix operations involving the line-of-sight linearization matrix 346 and the platform motion state model noise covariance matrix se.qs. As wil be shown, the quantity se.qs is computed from the quantities alpha__filt and q__filt which are part of the user-supplied system initialization data 238 (FIG. 3).

Figure 21:
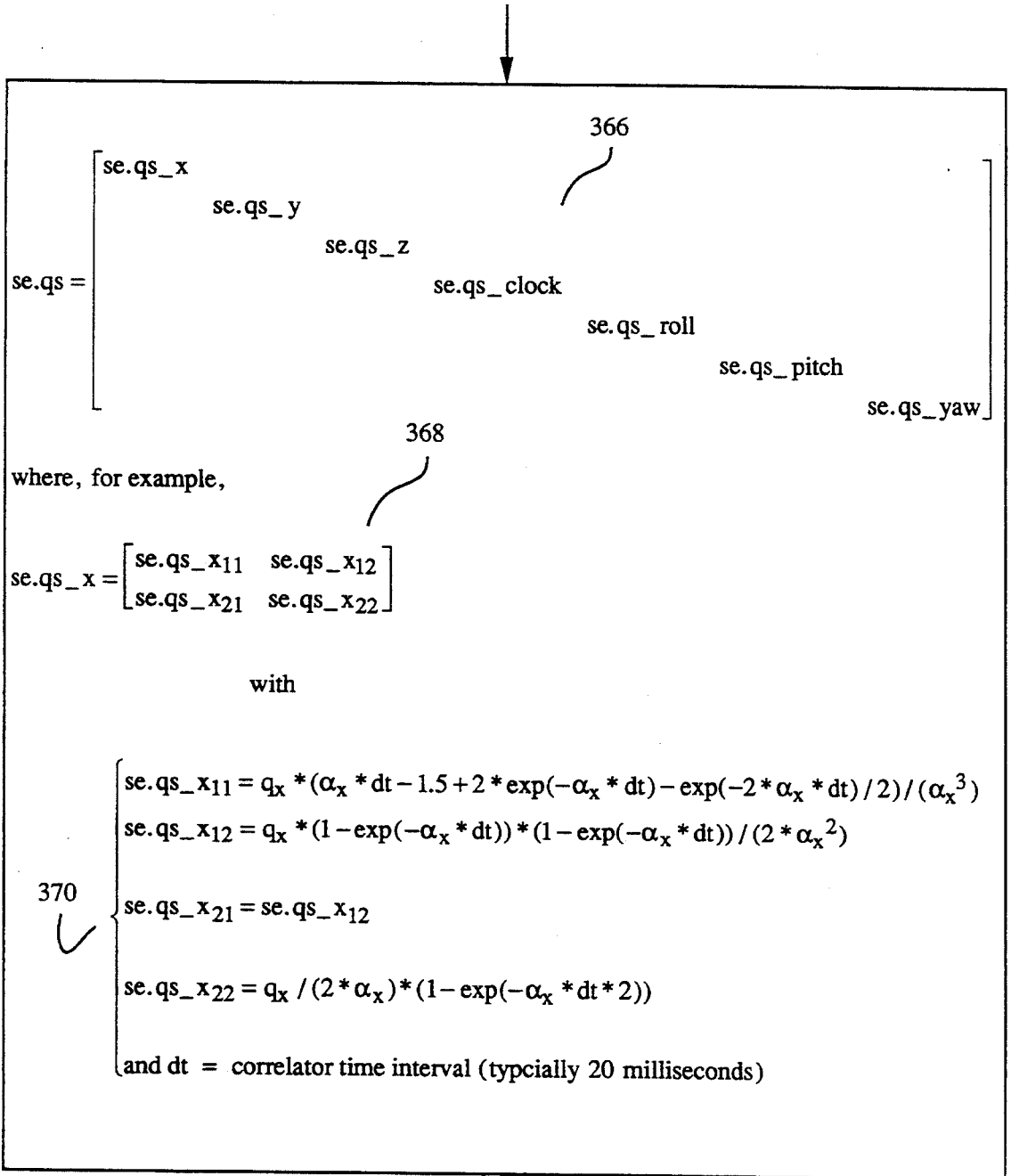
Figure 23:
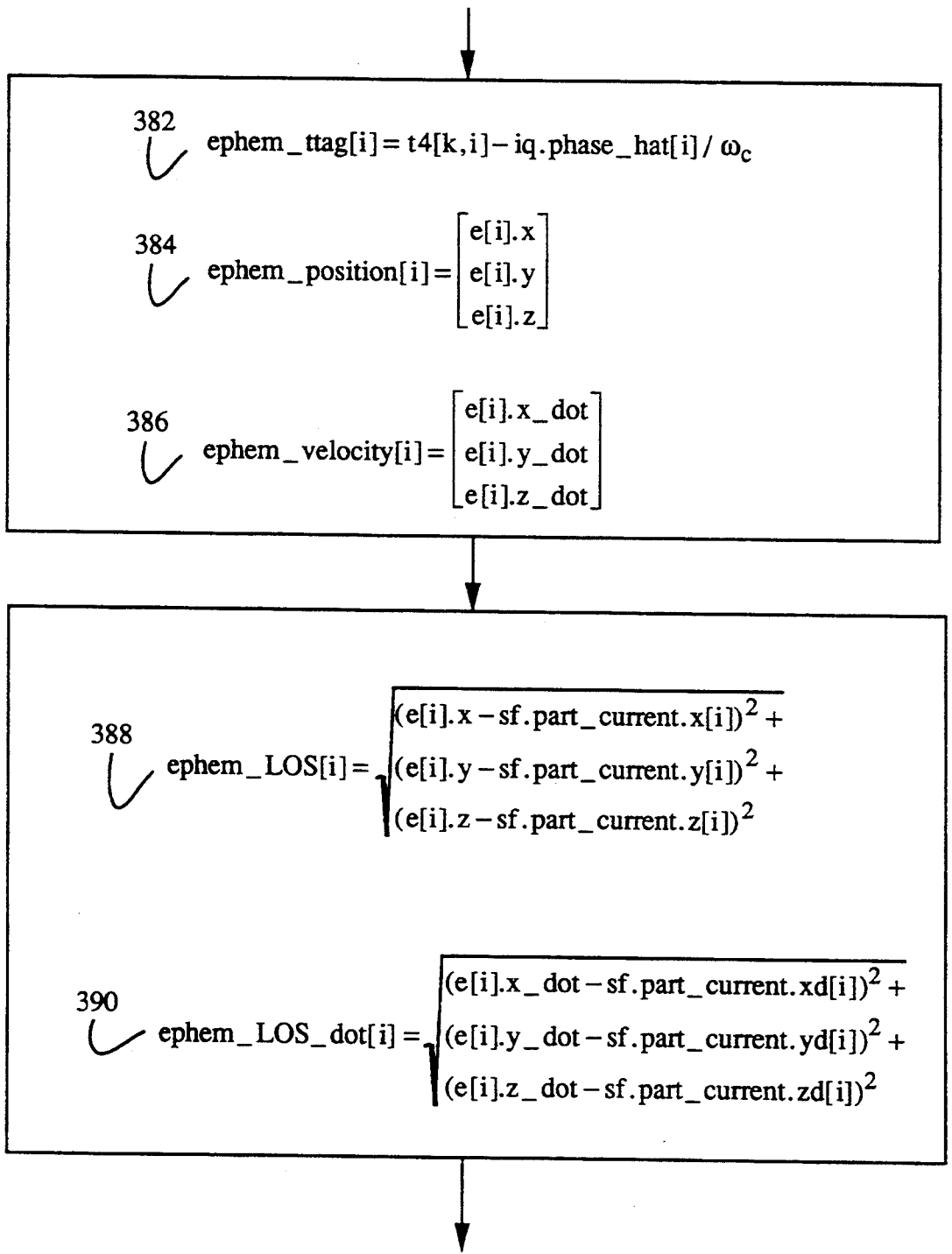

The overall structure of se.qe 360 for n LOS paths is shown in FIG. 20. The QL terms contained in se.qe 360 describe the correlation in LOS paths due to user translations, rotations, and receiver clock bias and are derived from se.qe__los 362 which in turn is computed by means of equation 364 using the LOS linearization matrix previously discussed. The platform motion state model noise covariance matrix se.qs 366 is generated from input parameters as shown in FIG. 21. As indicated in the figure, the platform motion state noise covariance matrix 366 is partitioned into smaller arrays corresponding to the translation, clock drift, and rotational motions of the platform. By way of an example, the partition 368 corresponding to the x-axis translation is shown. The elements of this 2-by-2 partition are computed from equations 370 where the various constants are obtained externally as components of the vectors alpha_filt 378 and q_filt 380, discussed below in connection with FIG. 22. This computation represents the transformation between the continuous-time navigation model and the discrete-time navigation model.

The identical partitions QB of se.qe 360 (FIG. 20) are next computed. The QB partitions need only be computed once—at receiver initialization time. The 2-by-2 QB array 372 is shown in more detail in FIG. 22. The continuous-time state noise model describing the carrier-code bias process is read in as components of the vectors alph_filt 378 and q_filt 380. Then, the operations 374 needed to convert from the continuous-time model to the discrete-time model are performed resulting in the elements of QB Finally, the identical partitions QR of se.qe 360 (FIG. 20) are computed. The QR partitions also need only be computed once—at receiver initialization time. The 1-by-1 QR partition 376 is defined in FIG. 22.

The computation of the new estimates of LOS whole phase and frequency values sf.x_base for the current channel requires the satellite positions and velocities to be updated. Satellite position and velocity updating is accomplished conventionally in step 12 as described for GPS in Interface Control Document ICD-200 (available from the NAVSTAR GPS Joint Program Office, United States Air Force Systems Command).

First, the satellite location at its time of transmission corresponding to the beginning time t4[k, i] of the next correlation for the current channel is established. A signal observed at the platform at t4[k, i] will have been emitted at the satellite at an earlier time. The current estimate iq.phase_hat[i] of the line-of-sight distance from the satellite to the platform, converted from radian units to time units, is the appropriate time advance. The estimated time of transmission is computed using equation 382 shown in FIG. 23. The quantity iq.phase_hat is obtained from sf.x_whole_current 344 (FIG. 18).

Next, the satellite position at the estimated time of transmission must be computed. For GPS the standard ICD-200 computation is employed to find the (x, y, z) earth-centered earth-fixed (ECEF) Cartesian coordinates corresponding to position ephem_position[i] 384 and to velocity ephem_velocity[i] 386, the value of i corresponding to the satellite associated with the current channel.

The ECEF values obtained above are used in step 13 to compute the "best" estimates of LOS phase, ephem_LOS[i] 388, and frequency, ephem_LOS_dot[i] 390, for the current channel. These values will be used for the next correlation interval.

If the externally-supplied differential corrections from a DGPS reference station are available, they are applied in step 14 to the above LOS values. The LOS and LOS rate values are also compensated for the user clock offset and offset rate, as previously estimated and stored in elements T and T_dot of the current navigation state vector sf.part_current.

There are two possible system configurations for utilizing externally-generated differential corrections in obtaining solutions to the platform navigation problem. In one configuration the differential corrections for pseudorange and pseudorange-rate are generated in a conventional fashion at a reference station geographically separated from the platform using techniques and standards given in the DGPS RTCM-104 document and sent by radio link or other real-time communication medium to the platform where they are passed on to the coupled-filter signal processor 230 (FIG. 2) and utilized in the vehicle position and attitude evaluator routine 252 (FIG. 3).

Figure 24:
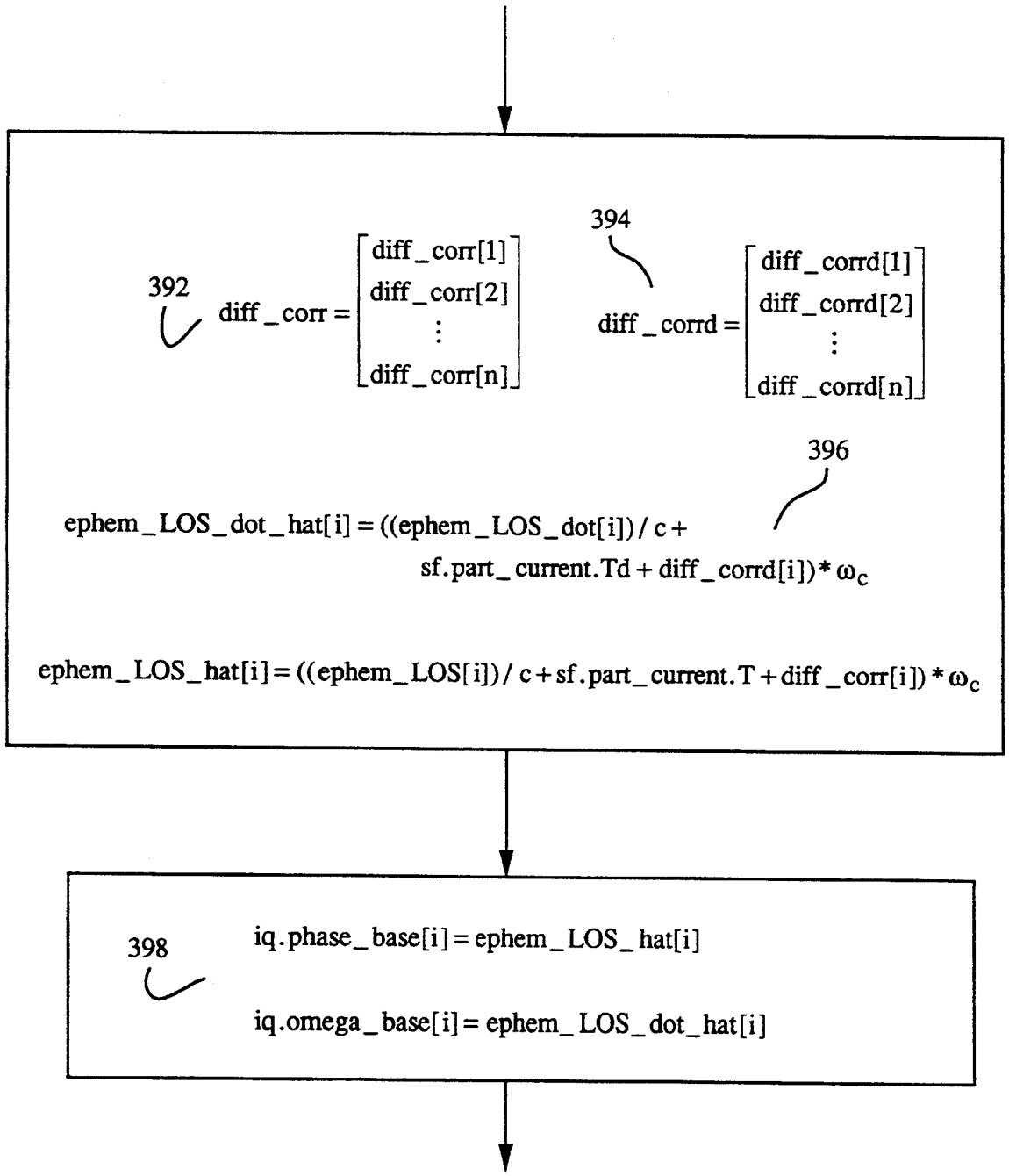
FIG. 24 completes the detailing of the operations carried out by the coupled-filter signal processor in performing the vehicle position and attitude evaluator routine.

For n LOS paths the pseudorange and pseudorange-rate differential corrections are defined by the expressions 392 and 394 respectively in FIG. 24. Although these differential corrections are generated by well-known techniques, their application directly in the signal tracking equations is unique to the present invention. By applying corrections in this fashion, the effects of satellite biases and propagation anomalies are removed from the phase and frequency estimates that are the products of the signal tracking equations. If this correction process were not performed at this stage, interpath line-of-sight correlations would be reduced thereby causing the coupled-filter signal processor to be less effective.

There are certain situations where a real-time radio link between reference station and platform cannot be maintained, e.g. land surveying.

The technique employed for non-real-time operation is quite different from that employed for conventional DGPS. Whereas in the conventional scheme pseudorange and carrier phase outputs from the reference station and platform are recorded for later marging in a signal processing scheme, the present invention requires that the sampled in-phase and quadrature outputs from the conventional receiver front-end (that form the inputs 206 (FIG. 2) to the correlation system 208 (FIG. 2)) be recorded by a high-speed digital recorder. These recorded digital data streams together with recorded pseudorange and carrier phase outputs obtained from the reference station are then played at some convenient later time into the correlator system 208 (FIG. 2) and the coupled-filter signal processor 230 (FIG. 2). The computational process performed by the coupled-filter signal processor is the same as it was for the real-time situation. In this way the navigational history of a platform can be determined in a manner fully-equivalent to the real-time process.

For either real-time or non-real-time operation the corrections are introduced as specified by equations 396 of FIG. 24. It should be noted that ephem$_{13}$LOS$_{13}$hat is expressed in radian units.

Finally, in step 15, the above corrected and compensated estimates are copied 398 into the first two components of sf.base. These base values, as well as the carrier bias values, replace the corresponding existing components in sf.x$_{13}$base$_{13}$next. The term sf.x$_{13}$base$_{13}$next denotes the base values to be employed in the k'th system cycle, the (k−1)'th cycle having just ended.

In step, 16 satellite almanac data received over satellite telemetry links are used to evaluate on a regular basis the elevation angles of satellites currently being processed, as in conventional GPS receivers. The potential visibility of other satellites in the constellation not being tracked are also regularly checked using the same constellation almanac data. Satellites that are presently being tracked are taken out of the tracking mode when they fall below an elevation masking angle of typically five degrees. Fresh satellites are brought into the signal acquisition process if their predicted elevation angles are above the elevation masking angle. Once it is determined that a new satellite is to be acquired and tracked, an unused correlator channel is assigned to that satellite, and the signal acquisition process commences. Signal acquisition is essentially the same as for a conventional signal processor, as described in many references: e.g. M. K. Simon et al., *Spread Spectrum Communications*, Vol. III, Computer Science Press, Rockville, Md., 1985; C. R. Cahn and E. H. Martin, "Design Considerations for a Spread Spectrum Navigation Receiver," Proceedings of International Conference on Electronic Systems and Navigation Aids, Paris, France, November 1977. Note that during the initial acquisition process the coupled-filter signal processor 230 (FIG. 2) and the assigned correlator channel operate in a decoupled mode. Once code and frequency acquisition have been achieved, the correlator channel is controlled in the coupled mode.

In performing step 17 in the reference generator command setup routine 254 (FIG. 3), the signal processor 230 (FIG. 2) utilizes the data contained in sf.$x_{13}$base$_{13}$-current for the current channel and generates commands to be sent to the reference generator 220 (FIG. 2) associated with the current channel which will cause the reference generator to generate a reference signal having specified values for carrier phase and frequency and modulating code phase during the next correlation interval. The reference generator command setup routine is detailed in FIG. 25.

Because of setup resolution limitations inherent in the design of the correlator system 208 (FIG. 2), the signal processor 230 (FIG. 2) must provide for error setpoints which are non-zero. For example, in the case of GPS the code generator in the reference generator 220 (FIG. 2) will only be programmable in fractional code chip steps. Likewise, the phase and frequency of the signal produced by a numerically-controlled oscillator (NCO) in a typical GPS reference generator can only be adjusted in increments that are much coarser than the precision of the values maintained by the signal processor. In recognition of this situation, and to avoid any operating limitation postulated on zero LOS state values, provisions are made in the signal processor for non-zero set-points to be sent to the reference generators.

The commands sf.$x_{13}$control to the reference generators are computed in accordance with equation 400. The base values come from the sf.$x_{13}$base$_{13}$next array (see equations 394 (FIG. 24) and discussion pertaining thereto).

The elements in the control vector correspond to NCO phase and frequency setup and code generator setup for one correlator channel. The first component, which controls the NCO phase setup, is the LOS estimate iq.phase$_{13}$base plus the carrier bias minus the desired NCO phase or setpoint. The second component, which controls the NCO frequency setup, is the estimated LOS rate plus the estimated carrier bias rate minus the desired NCO frequency offset or setpoint. The third component, which controls the code generator, is simply the LOS estimate iq.phase$_{13}$base minus the desired code generator offset or setpoint.

The specified setpoints 402 are stored in read-only memory in the signal processor.

What is claimed is:

1. A navigation receiver for use on platforms or vehicles of a variety of types, some types of said platforms being equipped with platform velocity sensors that provide velocity inputs to said receiver, said velocity sensors being characterized by a velocity bias parameter, some types of said platforms being equipped with attitude reference systems that provide inputs to said receiver of heading in some cases, heading and elevation in other cases, and heading, elevation, and yaw in still other cases, all of said attitude data being referenced to an earth-fixed coordinate system, said platforms being characterized by platform dynamics characterization data comprising platform velocity random process correlation time, platform rotation rate random process correlation time, platform velocity random process state noise disturbance power, and platform rotation rate random process state noise disturbance power, said receiver being capable of receiving a plurality of signals, said signals being transmitted by a plurality of spatially-distributed transmitters with known positions and velocities and being propagated to said receiver over a plurality of line-of-sight paths, said transmitted signals being modulated sinusoidal carriers, said transmitted signals being particular functions of time, said time being maintained in synchronized transmitter clocks, said transmitted signals being received through at least one of a plurality of spatially-distributed receiver ports, said received signals being characterized by signal parameters comprising carrier phase, carrier frequency, modulation phase, modulation phase rate-of-change, and carrier amplitude, said receiver having a clock, said receiver clock being maintained in synchronism with said transmitter clocks, said navigation receiver comprising:

a means for periodically measuring the correlations of each of said plurality of received signals with a plurality of reference signals, said measured correlations having noise components characterized by a correlation measurement noise covariance matrix; and a means for periodically estimating the values of a plurality of said signal parameters for each of said plurality of received signals, said estimating means utilizing said correlation measurements for a plurality of said received signals in obtaining said estimated signal parameter values for each of said received signals thereby obtaining more reliable estimates of said signal parameter values for each of said received signals than could be obtained by direct measurements of said signal parameters for each of said received signals or by estimates of said signal parameters based only on information derived from the received signal to which each pertains.

2. The navigation receiver of claim 1 wherein said measuring means is comprised of:

a means for generating said reference signals, said reference signals being replicas of said transmitted signals, said reference signals being characterized by a carrier phase, a carrier frequency, and a modulation phase, said received signals and said reference signals being grouped according to the transmitter with which said signals are associated; and a means for correlating each of said reference signals with the received signal in its group.

3. The navigation receiver of claim 2 further comprising:

a means for adjusting said reference signal carrier phase, said reference signal carrier frequency, and said reference signal modulation phase in accordance with commands supplied at an input port of said adjusting means;

a means for generating said adjustment commands from said signal parameter estimates and for supplying said adjustment commands to said adjusting means, said adjustment commands to result in each of said reference signals having a carrier phase, carrier frequency, and modulation phase within predetermined increments of said estimated values.

4. The navigation receiver of claim 1 wherein said estimating means comprises:

a means for periodically estimating the present values of the correlations of said received signals with said reference signals utilizing the most recent estimates of signal parameter values;

a means for perodically generating for each of said received signals a set of weighting coefficients for each of said signal parameters;

a means for periodically calculating for each of said received signals the estimated present value of each of said signal parameters, said calculation consisting of taking the differences between said present-value estimates of the correlations and the present measured values of the correlations for a plurality of received signals, multiplying each of said differences by the appropriate weighting coefficient from the set associated with the particular received signal and the particular signal parameter being calculated, summing the weighted differences over the plurality of correlations, and adding the weighted sum to the prior estimate of the value of the signal parameter extrapolated to the present.

5. The navigation receiver of claim 2 wherein said estimating means comprises:

a means for periodically estimating the present values of the correlations of said received signals with said reference signals utilizing the most recent estimates of signal parameter values;

a means for periodically generating for each of said received signals a set of weighting coefficients for each of said signal parameters;

a means for periodically calculating for each of said received signals the estimated present value of each of said signal parameters, said calculation consisting of taking the differences between said present-value estimates of the correlations and the present measured values of the correlations for a plurality of received signals, multiplying each of said differences by the appropriate weighting coefficient from the set associated with the particular received signal and the particular signal parameter being calculated, summing the weighted differences over the plurality of correlations, and adding the weighted sum to the prior estimate of the value of the signal parameter extrapolated to the present.

a means for adjusting said reference signal carrier phase, said reference signal carrier frequency, and said reference signal modulation phase in accordance with commands supplied at an input port of said adjusting means;

a means for generating said adjustment commands from said signal parameter estimates and for supplying said adjustment commands to said adjusting means, said adjustment commands to result in each of said reference signals having a carrier phase, carrier frequency, and modulation phase within predetermined increments of said estimated values.

6. The navigation receiver of claim 1 wherein said estimating means comprises:

a means for periodically estimating the present values of the correlations of said received signals with said reference signals utilizing the most recent estimates of signal parameter values;

a means for periodically estimating carrier amplitude for each of said received signals utilizing said measured correlations;

a means for entering said correlation measurement noise covariance matrix into said navigation receiver thereby making said covariance matrix available for calculations performed within said navigation receiver;

a means for entering said platform dynamics characterization data into said navigation receiver thereby making said characterization data available for calculations performed within said navigation receiver;

a means for periodically generating for each of said received signals a set of weighting coefficients for each of said signal parameters, said set of weighting coefficients constituting a row of the filter gain matrix, said set of weighting coefficients to be used in estimating the present value of the associated signal parameter, the generation of said filter gain matrix utilizing user-supplied, measured, and calculated data comprising said carrier amplitude estimates, said correlation measurement noise covariance matrix, and said platform dynamics characterization data;

a means for periodically calculating for each of said received signals the estimated present value of each of said signal parameters, said calculation consisting of taking the differences between said present-value estimates of the correlations and the present measured values of the correlations for a plurality of received signals, multiplying each of said differences by the appropriate weighting coefficient from the set associated with the particular received signal and the particular signal parameter being calculated, summing the weighted differences over the plurality of correlations, and adding the weighted sum to the prior estimate of the value of the signal parameter extrapolated to the present.

7. The navigation receiver of claim 1 further comprising a means for entering velocity data from said platform velocity sensor and platform attitude data from said attitude reference system into said navigation receiver thereby making said platform velocity and platform attitude data available for calculations performed within said navigation receiver, said signal parameter estimating means also providing estimates of the projections of said platform velocity bias on said line-of-sight paths of said received signals, said signal parameter estimating means also utilizing the projections of said platform velocity on said line-of-sight paths in obtaining said estimated signal parameter values for each of said received signals.

8. The navigation receiver of claim 1 further comprising a means for entering differential correction data into said navigation receiver thereby making said data available for calculations performed within said navigation receiver, said differential correction data compensating for errors in predicted positions and velocities of said reference transmitters, propagation anomalies, and clock drifts, said differential correction data comprising corrections to said estimates of carrier phase and carrier frequency for said plurality of received signals, said differential corrections being provided by an external source, said estimating means obtaining corrected estimates of carrier phase and carrier frequency by adding said differential corrections to said uncorrected estimates.

9. The navigation receiver of claim 1 further comprising a means for obtaining position and velocity data of said reference transmitters, said estimating means also obtaining present estimates of the position of said platform and the rate of change of said position utilizing said present estimates of carrier phase, carrier frequency, and modulation phase for a plurality of said received signals and said position and velocity data of said reference transmitters.

10. The navigation receiver of claim 9 wherein said estimating means also obtains present estimates of the attitude of said receiver platform and the rate of change of said attitude utilizing said present estimates of carrier phase, carrier frequency, and modulation phase for a plurality of said received signals.

11. A tracking receiver for use on fixed or mobile platforms in the cooperative tracking of other platforms, said other platforms being known as tracked platforms, said mobile tracking platforms being equipped with independent navigation means, said tracked platforms being of a variety of types, some types of said tracked platforms being equipped with platform velocity sensors that provide velocity inputs to said tracking receiver by means of a communication link, said velocity sensors being characterized by a velocity bias parameter, some types of said tracked platforms being equipped with attitude reference systems that provide inputs to said tracking receiver by means of said communication link of heading in some cases, heading and elevation in other cases, and heading, elevation, and yaw in still other cases, all of said attitude data being referenced to an earth-fixed coordinate system, said tracked platforms being characterized by platform dynamics characterization data comprising platform velocity random process correlation time, platform rotation rate random process correlation time, platform velocity random process state noise disturbance power, and platform rotation rate random process state noise disturbance power, said tracking receiver being capable of receiving signals through a plurality of spatially-distributed receiver ports, said signals being transmitted from said tracked platform to said tracking platform over a plurality of line-of-sight paths, said transmitted signals being modulated sinusoidal carriers transmitted through at least one transmit port, said received signals being characterized by signal parameters comprising carrier phase, carrier frequency, modulation phase, modulation phase rate-of-change, and carrier amplitude, said navigation receiver comprising:

a means for periodically measuring the correlations of each of said plurality of received signals with a plurality of reference signals, said measured correlations having noise components characterized by a correlation measurement noise covariance matrix; and a means for periodically estimating the values of a plurality of said signal parameters for each of said plurality of received signals, said estimating means utilizing said correlation measurements for a plurality of said received signals in obtaining said estimated signal parameter values for each of said received signals thereby obtaining more reliable estimates of said signal parameter values for each of said received signals than could be obtained by direct measurements of said signal parameters for each of said received signals or by estimates of said signal parameters based only on information derived from the received signal to which each pertains.

12. The tracking receiver of claim 11 wherein said measuring means is comprised of:

a means for generating said reference signals, said reference signals being replicas of said transmitted signals, said reference signals being characterized by a carrier phase, a carrier frequency, and a modulation phase, said received signals and said reference signals being grouped according to the transmitter with which said signals are associated; and a means for correlating each of said reference signals with the received signal in its group.

13. The tracking receiver of claim 12 further comprising:

a means for adjusting said reference signal carrier phase, said reference signal carrier frequency, and said reference signal modulation phase in accordance with commands supplied at an input port of said adjusting means;

a means for generating said adjustment commands from said signal parameter estimates and for supplying said adjustment commands to said adjusting means, said adjustment commands to result in each of said reference signals having a carrier phase, carrier frequency, and modulation phase within predetermined increments of said estimated values.

14. The tracking receiver of claim 11 wherein said estimating means comprises:

a means for periodically estimating the present values of the correlations of said received signals with said reference signals utilizing the most recent estimates of signal parameter values;

a means for periodically generating for each of said received signals a set of weighting coefficients for each of said signal parameters;

a means for periodically calculating for each of said received signals the estimated present value of each of said signal parameters, said calculation consisting of taking the differences between said present-value estimates of the correlations and the present measured values of the correlations for a plurality of received signals, multiplying each of said differences by the appropriate weighting coefficient from the set associated with the particular received signal and the particular signal parameter being calculated, summing the weighted differences over the plurality of correlations, and adding the weighted sum to the prior estimate of the value of the signal parameter extrapolated to the present.

15. The tracking receiver of claim 12 wherein said estimating means comprises:

a means for periodically estimating the present values of the correlations of said received signals with said reference signals utilizing the most recent estimates of signal parameter values;

a means for periodically generating for each of said received signals a set of weighting coefficients for each of said signal parameters;

a means for periodically calculating for each of said received signals the estimated present value of each of said signal parameters, said calculation consisting of taking the differences between said present-value estimates of the correlations and the present measured values of the correlations for a plurality of received signals, multiplying each of said differences by the appropriate weighting coefficient from the set associated with the particular received signal and the particular signal parameter being calculated, summing the weighted differences over the plurality of correlations, and adding the weighted sum to the prior estimate of the value of the signal parameter extrapolated to the present.

a means for adjusting said reference signal carrier phase, said reference signal carrier frequency, and said reference signal modulation phase in accordance with commands supplied at an input port of said adjusting means;

a means for generating said adjustment commands from said signal parameter estimates and for supplying said adjustment commands to said adjusting means, said adjustment commands to result in each of said reference signals having a carrier phase, carrier frequency, and modulation phase within predetermined increments of said estimated values.

16. The tracking receiver of claim 11 wherein said estimating means comprises:

a means for periodically estimating the present values of the correlations of said received signals with said reference signals utilizing the most recent estimates of signal parameter values;

a means for periodically estimating carrier amplitude for each of said received signals utilizing said measured correlations;

a means for entering said correlation measurement noise covariance matrix into said navigation receiver thereby making said covariance matrix available for calculations performed within said navigation receiver;

a means for entering said platform dynamics characterization data into said navigation receiver thereby making said characterization data available for calculations performed within said navigation receiver;

a means for periodically generating for each of said received signals a set of weighting coefficients for each of said signal parameters, said set of weighting coefficients constituting a row of the filter gain matrix, said set of weighting coefficients to be used in estimating the present value of the associated signal parameter, the generation of said filter gain matrix utilizing user-supplied, measured and calculated data comprising said carrier amplitude estimates, said correlation measurement noise covariance matrix, and said platform dynamics characterization data;

a means for periodically calculating for each of said received signals the estimated present value of each of said signal parameters, said calculation consisting of taking the differences between said present-value estimates of the correlations and the present measured values of the correlations for a plurality of received signals, multiplying each of said differences by the appropriate weighting coefficient from the set associated with the particular received signal and the particular signal parameter being calculated, summing the weighted differences over the plurality of correlations, and adding the weighted sum to the prior estimate of the value of the signal parameter extrapolated to the present.

17. The tracking receiver of claim 11 further comprising a means for entering velocity data from said tracked platform velocity sensor and attitude data from said tracked platform attitude reference system into said tracking receiver thereby making said tracked platform velocity and said tracked platform attitude data available for calculations performed within said tracking receiver, said signal parameter estimating means also providing estimates of the projections of said platform velocity bias on said line-of-sight paths of said received signals, said signal parameter estimating means also utilizing the projections of said platform velocity on said line-of-sight paths in obtaining said estimated signal parameter values for each of said received signals.

18. The tracking receiver of claim 11 further comprising a means for entering differential correction data into said tracking receiver thereby making said data available for calculations performed within said tracking receiver, said differential correction data compensating for errors in predicted positions and velocities of said tracking platforms, propagation anomalies, and clock drifts, said differential correction data comprising corrections to said estimates of carrier phase and carrier frequency for said plurality of received signals, said differential corrections being provided by an external source, said estimating means obtaining corrected estimates of carrier phase and carrier frequency by adding said differential corrections to said uncorrected estimates.

19. The tracking receiver of claim 11 further comprising a means for obtaining position and velocity data of said tracking platform, said estimating means also obtaining present estimates of the position of said tracked platform and the rate of change of said position utilizing said present estimates of carrier phase, carrier frequency, and modulation phase for a plurality of said received signals and said position and velocity data of said tracking platform.

20. The tracking receiver of claim 19 wherein said estimating means also obtains present estimates of the attitude of said tracked platform and the rate of change of said attitude utilizing said present estimates of carrier phase, carrier frequency, and modulation phase for a plurality of said received signals.

21. A method of using the navigation receiver of claim 8 comprising the steps:

recording said received signals prior to measuring said correlations;

playing back said recorded signals into said correlation measuring means in place of said real-time received signals, said correlation measuring means thereby periodically measuring the correlations of each of said plurality of recorded received signals with a plurality of reference signals.

22. The method of claim 21 comprising the additional steps:

recording said differential correction data;

playing back said recorded differential correction data into said receiver in place of said real-time differential correction data in synchronism with playback of said recorded received signals thereby obtaining corrected estimates of carrier phase and carrier frequency by the adding of said differential corrections to said uncorrected estimates in said receiver.

23. A method of using the navigation receiver of claim 18 comprising the steps:
recording said received signals prior to measuring said correlations;
playing back said recorded signals into said correlation measuring means in place of said real-time received signals, said correlation measuring means thereby periodically measuring the correlations of each of said plurality of recorded received signals with a plurality of reference signals.

24. The method of claim 23 comprising the additional steps:
recording said differential correction data;
playing back said recorded differential correction data into said receiver in place of said real-time differential correction data in synchronism with playback of said recorded received signals thereby obtaining corrected estimates of carrier phase and carrier frequency by the adding of said differential corrections to said uncorrected estimates in said receiver.

25. A method of using a navigation receiver on platforms or vehicles of a variety of types, some types of said platforms being equipped with platform velocity sensors that provide velocity inputs to said receiver, said velocity sensors being characterized by a velocity bias parameter, some types of said platforms being equipped with attitude reference systems that provide inputs to said receiver of heading in some cases, heading and elevation in other cases, and heading, elevation, and yaw in still other cases, all of said attitude data being referenced to an earth-fixed coordinate system, said platforms being characterized by platform dynamics characterization data comprising platform velocity random process correlation time, platform rotation rate random process correlation time, platform velocity random process state noise disturbance power, and platform rotation rate random process state noise disturbance power, said receiver being capable of receiving a plurality of signals, said signals being transmitted by a plurality of spatially-distributed transmitters with known positions and velocities and being propagated to said receiver over a plurality of line-of-sight paths, said transmitted signals being modulated sinusoidal carriers, said transmitted signals being particular functions of time, said time being maintained in synchronized transmitter clocks, said transmitted signals being received through at least one of a plurality of spatially-distributed receiver ports, said received signals being characterized by signal parameters comprising carrier phase, carrier frequency, modulation phase, modulation phase rate-of-change, and carrier amplitude, said receiver having a clock, said receiver clock being maintained in synchronism with said transmitter clocks, said navigation receiver comprising:
a means for periodically measuring the correlations of each of said plurality of received signals with a plurality of reference signals, said measured correlations having noise components characterized by the correlation measurement noise covariance matrix; and
a means for periodically estimating the values of a plurality of said signal parameters for each of said plurality of received signals, said estimating means utilizing said correlation measurements for a plurality of said received signals in obtaining said estimated signal parameter values for each of said received signals thereby obtaining more reliable estimates of said signal parameter values for each of said received signals than could be obtained by direct measurements of said signal parameters for each of said received signals or by estimates of said signal parameters based only on information derived from the received signal to which each pertains;
said method of using comprising the steps;
recording said received signals prior to measuring said correlations;
playing back said recorded signals into said correlation measuring means in place of said real-time received signals, said correlation measuring means thereby periodically measuring the correlations of each of said plurality of recorded received signals with a plurality of reference signals.

26. The method of claim 25, said navigation receiver further comprising a means for entering differential correction data into said navigation receiver thereby making said data available for calculations performed within said navigation receiver, said differential correction data compensating for errors in predicted positions and velocities of said reference transmitters, propagation anomalies, and clock drifts, said differential correction data comprising corrections to said estimates of carrier phase and carrier frequency for said plurality of received signals, said differential corrections being provided by an external source, said estimating means obtaining corrected estimates of carrier phase and carrier frequency by adding said differential corrections to said uncorrected estimates, said method comprising the additional steps:
recording said differential correction data;
playing back said recorded differential correction data into said receiver in place of said real-time differential correction data in synchronism with playback of said recorded received signals thereby obtaining corrected estimates of carrier phase and carrier frequency by the adding of said differential corrections to said uncorrected estimates in said receiver.

27. A method of using a tracking receiver on fixed or mobile platforms in the cooperative tracking of other platforms, said other platforms being known as tracked platforms, said mobile tracking platforms being equipped with independent navigation means, said tracked platforms being of a variety of types, some types of said tracked platforms being equipped with platform velocity sensors that provide velocity inputs to said tracking receiver by means of a communication link, said velocity sensors being characterized by a velocity bias parameter, some types of said tracked platforms being equipped with attitude reference systems that provide inputs to said receiver by means of said communication link of heading in some cases, heading and elevation in other cases, and heading, elevation, and yaw in still other cases, all of said attitude data being referenced to an earth-fixed coordinate system, said tracked platforms being characterized by platform dynamics characterization data comprising platform velocity random process correlation time, platform rotation rate random process correlation time, platform velocity random process state noise disturbance power, and platform rotation rate random process state noise disturbance power, said receiver being capable of receiving signals through a plurality of spatially-distributed receiver ports, said signals being transmitted from said tracked platform to said tracking platform over a plurality of line-of-sight paths, said transmitted signals being modulated sinusoidal carriers transmitted through at least one transmit port, said received signals being characterized by signal parameters comprising carrier phase, carrier frequency, modulation phase, modulation phase rate-of-change, and carrier amplitude, said tracking receiver comprising:

a means for periodically measuring the correlations of each of said plurality of received signals with a plurality of reference signals, said measured correlations having noise components characterized by the correlation measurement noise covariance matrix; and a means for periodically estimating the values of a plurality of said signal parameters for each of said plurality of received signals, said estimating means utilizing said correlation measurements for a plurality of said received signals in obtaining said estimated signal parameter values for each of said received signals thereby obtaining more reliable estimates of said signal parameter values for each of said received signals than could be obtained by direct measurements of said signal parameters for each of said received signals or by estimates of said signal parameters based only on information derived from the received signal to which each pertains;

said method of using comprising the steps:

recording said received signals prior to measuring said correlations;

playing back said recorded signals into said correlation measuring means in place of said real-time received signals, said correlation measuring means thereby periodically measuring the correlations of each of said plurality of recorded received signals with a plurality of reference signals.

28. The method of claim 27, said tracking receiver further comprising a means for entering differential correction data into said tracking receiver thereby making said data available for calculations performed within said tracking receiver, said differential correction data compensating for errors in predicted positions and velocities of said tracking platforms, propagation anomalies, and clock drifts, said differential correction data comprising corrections to said estimates of carrier phase and carrier frequency for said plurality of received signals, said differential corrections being provided by an external source, said estimating means obtaining corrected estimates of carrier phase and carrier frequency by adding said differential corrections to said uncorrected estimates, said method comprising the additional steps:

recording said differential correction data;

playing back said recorded differential correction data into said receiver in place of said real-time differential correction data in synchronism with playback of said recorded received signals thereby obtaining corrected estimates of carrier phase and carrier frequency by the adding of said differential corrections to said uncorrected estimates in said receiver.

29. A method for obtaining navigation data from signals received from a plurality of spatially-distributed reference transmitters with known positions and velocities, said method being used on platforms or vehicles of a variety of types, some types of said platforms being equipped with platform velocity sensors, said velocity sensors being characterized by a velocity bias parameter, said velocity and velocity bias parameter being used in practicing said method, some types of said platforms being equipped with attitude reference systems that provide heading in some cases, heading and elevation in other cases, and heading, elevation, and yaw in still other cases, said attitude data being used in practicing said method, all of said attitude data being referenced to an earth-fixed coordinate system, said platforms being characterized by platform dynamics characterization data comprising platform velocity random process correlation time, platform rotation rate random process correlation time, platform velocity random process state noise disturbance power, and platform rotation rate random process state noise disturbance power, said platform dynamics data being used in practicing said method, said transmitted signals being modulated sinusoidal carriers, said transmitted signals being particular functions of time, said time being maintained in synchronized transmitter clocks, said transmitted signals being propagated to said platforms over a plurality of line-of-sight paths and being received through at least one of a plurality of spatially-distributed receiving ports, said received signals being characterized by signal parameters comprising carrier phase, carrier frequency, modulation phase, modulation phase rate-of-change, and carrier amplitude, said method comprising the steps:

measuring periodically the correlations of each of said plurality of received signals with a plurality of reference signals, said measured correlations having noise components characterized by the correlation measurement noise covariance matrix; and estimating periodically the values of a plurality of said signal parameters and the projection of said velocity sensor bias on the line-of-sight path for each of said plurality of received signals, said estimating means utilizing said correlation measurements for a plurality of said received signals, the projections of said platform velocity on said line-of-sight paths, said correlation measurement noise covariance matrix, and said platform dynamics data in obtaining said estimated signal parameter values for each of said received signals thereby obtaining more reliable estimates of said signal parameter values and velocity bias projection for each of said received signals than could be obtained by direct measurements of said signal parameters and velocity bias projection for each of said received signals or by estimates of said signal parameters and velocity bias projection based only on information derived from the received signal to which each pertains.

30. The method of claim 29 wherein said estimating step comprises the steps:

estimating the present values of said correlations of said received signals with said reference signals and said velocity projection utilizing the most recent estimates of signal parameter values;

generating for each of said received signals a set of weighting coefficients for each of said signal parameters;

calculating for each of said received signals the estimated present value of each of said signal parameters and said velocity bias projection, said calculation consisting of taking the differences between said present-value estimates of the correlations and velocity projection and the present measured values of the correlations and velocity projection for a plurality of received signals, multiplying each of said differences by the appropriate weighting coefficient from the set associated with the particular received signal and the particular signal parameter or velocity bias projection being calculated, summing the weighted differences over the plurality of correlations, and adding the weighted sum to the prior estimate of the value of the signal parameter extrapolated to the present.

31. The method of claim 29 comprising the additional steps:

obtaining position and velocity data of said reference transmitters;

obtaining present estimates of the position of said platform and the rate of change of said position utilizing said present estimates of carrier phase, carrier frequency, and modulation phase for a plurality of said received signals and said position and velocity data of said reference transmitters;

obtaining present estimates of the attitude of said platform and the rate of change of said attitude utilizing said present estimates of carrier phase, carrier frequency, and modulation phase for a plurality of said received signals.

32. A method of cooperatively tracking mobile platforms known as tracked platforms, said tracked platforms transmitting at least one signal, said method being practiced on fixed or mobile platforms known as tracking platforms, said mobile tracking platforms being equipped with independent navigation means, said tracked platforms being of a variety of types, some types of said tracked platforms being equipped with platform velocity sensors that provide velocity inputs to said tracking receiver by means of a communication link, said velocity sensors being characterized by a velocity bias parameter, said velocity and velocity bias parameter being used in practicing said method, some types of said platforms being equipped with attitude reference systems that provide inputs by means of said communication link of heading in some cases, heading and elevation in other cases, and heading, elevation, and yaw in still other cases, said attitude data being used in practicing said method, all of said attitude data being referenced to an earth-fixed coordinate system, said tracked platforms being characterized by platform dynamics characterization data comprising platform velocity random process correlation time, platform rotation rate random process correlation time, platform velocity random process state noise disturbance power, and platform rotation rate random process state noise disturbance power, said platform dynamics data being used in practicing said method, said signals being transmitted from said tracked platform to said tracking platform over a plurality of line-of-sight paths, said signals being received through a plurality of spatially-distributed receiving ports, said transmitted signals being modulated sinusoidal carriers transmitted through at least one transmit port, said received signals being characterized by signal parameters comprising carrier phase, carrier frequency, modulation phase, modulation phase rate-of-change, and carrier amplitude, said method comprising the steps:

measuring periodically the correlations of each of said plurality of received signals with a plurality of reference signals, said measured correlations having noise components characterized by the correlation measurement noise covariance matrix; and estimating periodically the values of a plurality of said signal parameters and the projection of said velocity sensor bias on the line-of-sight path for each of said plurality of received signals, said estimating means utilizing said correlation measurements for a plurality of said received signals, the projections of said platform velocity on said line-of-sight paths, said correlation measurement noise covariance matrix, and said platform dynamics data in obtaining said estimated signal parameter values for each of said received signals thereby obtaining more reliable estimates of said signal parameter values and velocity bias projection for each of said received signals than could be obtained by direct measurements of said signal parameters and velocity bias projection for each of said received signals or by estimates of said signal parameters and velocity bias projection based only on information derived from the received signal to which each pertains.

33. The method of claim 32 wherein said estimating step comprises the steps:

estimating the present values of said correlations of said received signals with said reference signals and said velocity projection utilizing the most recent estimates of signal parameter values;

generating for each of said received signals a set of weighting coefficients for each of said signal parameters;

calculating for each of said received signals the estimated present value of each of said signal parameters and said velocity bias projection, said calculation consisting of taking the differences between said present-value estimates of the correlations and velocity projection and the present measured values of the correlations and velocity projection for a plurality of received signals, multiplying each of said differences by the appropriate weighting coefficient from the set associated with the particular received signal and the particular signal parameter or velocity bias projection being calculated, summing the weighted differences over the plurality of correlations, and adding the weighted sum to the prior estimate of the value of the signal parameter extrapolated to the present.

34. The method of claim 32 comprising the additional steps:

obtaining position and velocity data of said tracking platform;

obtaining present estimates of the position of said tracked platform and the rate of change of said position utilizing said present estimates of carrier phase, carrier frequency, and modulation phase for a plurality of said received signals and said position and velocity data of said tracking platform;

obtaining present estimates of the attitude of said tracked platform and the rate of change of said attitude utilizing said present estimates of carrier phase, carrier frequency, and modulation phase for a plurality of said received signals.

* * * * *

UNITED STATES PATENT AND TRADEMARK OFFICE
CERTIFICATE OF CORRECTION

PATENT NO. : 5,343,209
DATED : Aug. 30, 1994
INVENTOR(S) : James W. Sennott; David Senffner It is certified that error appears in the above-indentified patent and that said Letters Patent is hereby corrected as shown below:

Column 8, step 5 in table, change "an" to -- and --; step 16, change "assinments" to -- assignments --. Column 13, line 46, underline "all"; line 47, underline "any". Column 15, line 22, change "sf.res_[i]" to -- sf.res[i] --; line 29, change "sf.res" to -- sf.res[i] --; line 29, change "sf.k." to -- sf.k_[i] --; line 33, change "sf.base_last" to -- sf.x_base_last --; line 63, change "_base_temp" to -- sf.x_base_temp --. Column 18, line 33, change "marging" to -- merging --; line 51, change "ephem$_{13}$LOS$_{13}$hat" to -- ephem_LOS_hat --; line 57, change "sf.x$_{13}$base$_{13}$next", each occurrence, to -- sf.x_base_next --; line 60, delete comma after "step". Column 19, lines 23-24, change "sf.x$_{13}$base$_{13}$current" to -- sf.x_base_current --; line 51, change "sf.x$_{13}$base$_{13}$next" to -- sf.x_base_next --.

Signed and Sealed this

Fourteenth Day of February, 1995

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO.    : 5,643,209
DATED         : July 1, 1997
INVENTOR(S)   : Fugoso et al.

It is certified that error appears in the above-identified patent and that said Letters Patent is hereby corrected as shown below:

| | |
|---|---|
| Col. 5, Line 35, | "shalt" should be "shaft" |
| Col. 6, Line 16, | "0.003 ram." should be "0.003 mm." |
| Col. 3, Line 10: | "arm" should be "atm" |
| Col. 3, Line 13: | "arm" should be "atm" |
| Col 3, Line 35: | "9 via the inflection lumen 21" should be "9 via the inflation lumen 21" |
| Col. 5, Line 16: | "inflation Lumen" should be "Inflation Lumen" |
| Abstract, line 14, | "Step" should be "step" |

Signed and Sealed this

Nineteenth Day of May, 1998

Attest:

BRUCE LEHMAN

*Attesting Officer*          *Commissioner of Patents and Trademarks*